US012058783B2

(12) United States Patent
Paladugu et al.

(10) Patent No.: US 12,058,783 B2
(45) Date of Patent: Aug. 6, 2024

(54) RELAY ADAPTATION PROTOCOL LAYER CONFIGURATION

(71) Applicant: QUALCOMM Incorporated, San Diego, CA (US)

(72) Inventors: Karthika Paladugu, San Diego, CA (US); Hong Cheng, Basking Ridge, NJ (US); Adrian Edward Escott, Reading (GB); Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/302,677

(22) Filed: May 10, 2021

(65) Prior Publication Data

US 2021/0352767 A1 Nov. 11, 2021

Related U.S. Application Data

(60) Provisional application No. 63/023,212, filed on May 11, 2020.

(51) Int. Cl.
*H04W 88/04* (2009.01)
*H04W 40/22* (2009.01)
(Continued)

(52) U.S. Cl.
CPC ........... *H04W 88/04* (2013.01); *H04W 40/22* (2013.01); *H04W 76/11* (2018.02); *H04W 76/14* (2018.02); *H04W 92/18* (2013.01)

(58) Field of Classification Search
CPC . H04B 7/14; H04B 7/15–15535; H04L 61/00; H04W 8/005; H04W 8/26;
(Continued)

(56) References Cited

U.S. PATENT DOCUMENTS

2018/0213577 A1 7/2018 Burbidge et al.
2019/0261450 A1* 8/2019 Adachi ................. H04W 76/11
(Continued)

FOREIGN PATENT DOCUMENTS

EP 3579642 A1 12/2019
EP 3598840 A1 1/2020

OTHER PUBLICATIONS

International Search Report and Written Opinion—PCT/US2021/070528—ISA/EPO—Sep. 14, 2021.

*Primary Examiner* — Thomas R Cairns
(74) *Attorney, Agent, or Firm* — Harrity & Harrity, LLP

(57) ABSTRACT

Various aspects of the present disclosure generally relate to wireless communication. In some aspects, a relay user equipment may establish a sidelink unicast link with a remote UE via a sidelink signaling interface; receive, from a network entity, configuration information comprising at least one of: remote UE link identifier information associated with the sidelink unicast link for a relay service, an RLC channel mapping between the one or more RLC channels of the sidelink unicast link and the link with the network entity, or data routing information associated with the relay service; configure the one or more RLC channels for the sidelink unicast link and the link with the network entity based at least in part on the configuration information; and relay communications between the remote UE and the network entity based at least in part on the configuration information. Numerous other aspects are provided.

35 Claims, 22 Drawing Sheets

(51) Int. Cl.
*H04W 76/11* (2018.01)
*H04W 76/14* (2018.01)
*H04W 92/18* (2009.01)

(58) Field of Classification Search
CPC ..... H04W 16/26; H04W 40/22; H04W 76/11; H04W 76/14; H04W 84/047; H04W 84/18; H04W 88/04; H04W 92/18; H04W 40/02; H04W 92/10
See application file for complete search history.

(56) References Cited

U.S. PATENT DOCUMENTS

| | | | |
|---|---|---|---|
| 2022/0141686 A1* | 5/2022 | Korhonen | H04W 24/08 370/252 |
| 2022/0159771 A1* | 5/2022 | Fujishiro | H04L 45/74 |
| 2022/0330361 A1* | 10/2022 | Ding | H04W 48/10 |
| 2022/0418015 A1* | 12/2022 | Paladugu | H04W 76/15 |

* cited by examiner

RELAY ADAPTATION PROTOCOL LAYER CONFIGURATION

CROSS-REFERENCE TO RELATED APPLICATION

This patent application claims priority to U.S. Provisional Patent Application No. 63/023,212, filed on May 11, 2020, entitled "RELAY ADAPTATION PROTOCOL LAYER CONFIGURATION," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for relay adaptation protocol (RAP) layer configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a relay user equipment (UE) includes establishing a connection with a remote UE for relaying communication; receiving, from a network entity, configuration information comprising at least one of: remote UE connection identifier information associated with the connection between the remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; configuring the one or more relaying channels of the connection and the one or more relaying channels of the link with the network entity based at least in part on the configuration information; and relaying communications between the remote UE and the network entity based at least in part on the configuration information.

In some aspects, a method of wireless communication performed by a network entity includes transmitting, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; and communicating with the remote UE via the relay UE based at least in part on the configuration information.

In some aspects, a method of wireless communication performed by a remote user equipment (UE) includes establishing a connection with a relay UE; configuring one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE; and communicating with a network entity via the relay UE based at least in part on the configuration information.

In some aspects, an apparatus for wireless communication at a relay user equipment (UE) includes a memory; and one or more processors, coupled to the memory, configured to: establish a connection with a remote UE for relaying communication; receive, from a network entity, configuration information comprising at least one of: remote UE connection identifier information associated with the connection between the remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; configure the one or more relaying channels of the connection and the one or more relaying channels of the link with the network entity based at least in part on the configuration information; and relay communications between the remote UE and the network entity based at least in part on the configuration information.

In some aspects, an apparatus for wireless communication at a network entity includes a memory; and one or more processors, coupled to the memory, configured to: transmit, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; and communicate with the remote UE via the relay UE based at least in part on the configuration information.

In some aspects, an apparatus for wireless communication at a remote user equipment (UE) includes a memory; and one or more processors, coupled to the memory, configured to: establish a connection with a relay UE; configure one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE; and communicate with a network entity via the relay UE based at least in part on the configuration information.

In some aspects, a non-transitory computer-readable medium storing a set of instructions for wireless communication includes one or more instructions that, when executed by one or more processors of a relay user equipment (UE), cause the UE to: establish a connection with a remote UE for relaying communication; receive, from a network entity, configuration information comprising at least one of: remote UE connection identifier information associated with the connection between the remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; configure the one or more relaying channels of the connection and the one or more relaying channels of the link with the network entity based at least in part on the configuration information; and relay communications between the remote UE and the network entity based at least in part on the configuration information.

In some aspects, a non-transitory computer-readable medium storing a set of instructions for wireless communication includes one or more instructions that, when executed by one or more processors of a network entity, cause the network entity to: transmit, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; and communicate with the remote UE via the relay UE based at least in part on the configuration information.

In some aspects, a non-transitory computer-readable medium storing a set of instructions for wireless communication includes one or more instructions that, when executed by one or more processors of a remote user equipment (UE), cause the UE to: establish a connection with a relay UE; configure one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE; and communicate with a network entity via the relay UE based at least in part on the configuration information.

In some aspects, an apparatus for wireless communication includes means for establishing a connection with a remote user equipment (UE) for relaying communication; means for receiving, from a network entity, configuration information comprising at least one of: remote UE connection identifier information associated with the connection between the remote UE and the apparatus for a relay service, a configuration including relaying channel identifier information, wherein the configuration is for the connection between the remote UE and the apparatus and for a link with the network entity, wherein the configuration indicates a relaying channel mapping between one or more relaying channels of the connection and one or more relaying channels of the link with the network entity; means for configuring the one or more relaying channels of the connection and the one or more relaying channels of the link with the network entity based at least in part on the configuration information; and means for relaying communications between the remote UE and the network entity based at least in part on the configuration information.

In some aspects, an apparatus for wireless communication includes means for transmitting, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the apparatus, wherein the configuration indicates a relaying channel mapping between one or more relaying channels of the connection and one or more relaying channels of the link with the apparatus; and means for communicating with the remote UE via the relay UE based at least in part on the configuration information.

In some aspects, an apparatus for wireless communication includes means for establishing a connection with a relay user equipment (UE); means for configuring one or more relaying channels for the connection based at least in part on configuration information, wherein the configuration information includes at least one of: remote UE connection identifier information associated with the connection between the apparatus and the relay UE for a relay service, or a configuration for one or more relaying channels for the connection between the apparatus and the relay UE; and means for communicating with a network entity via the relay UE based at least in part on the configuration information.

In some aspects, a method of wireless communication, performed by a relay user equipment (UE), may include establishing a sidelink unicast link with a remote UE via a sidelink signaling interface; receiving, from a network entity, configuration information comprising at least one of: remote UE link identifier information associated with the sidelink unicast link between the remote UE and the relay UE for a relay service, an RLC channel mapping between the one or more RLC channels of the sidelink unicast link and the link with the network entity, or data routing information associated with the relay service; configuring the one or more RLC channels for the sidelink unicast link and the link with the network entity based at least in part on the configuration information; and relaying communications between the remote UE and the network entity based at least in part on the configuration information.

In some aspects, a method of wireless communication, performed by a network entity, may include transmitting, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service; and communicating with the remote UE via the relay UE based at least in part on the configuration information.

In some aspects, a method of wireless communication, performed by a remote user equipment, may include establishing a sidelink unicast link with a relay UE via a sidelink signaling interface; configuring one or more radio link control (RLC) channels for the sidelink unicast link based at least in part on configuration information, wherein the configuration information includes at least one of: remote UE link identifier information associated with the sidelink unicast link between the remote UE and the relay UE for a relay service, or communicating with a network entity via the relay UE based at least in part on the configuration information.

In some aspects, a relay user equipment for wireless communication may include a memory and one or more processors coupled to the memory. The memory and the one or more processors may be configured to establish a sidelink unicast link with a remote UE via a sidelink signaling interface; receive, from a network entity, configuration information comprising at least one of: remote UE link identifier information associated with the sidelink unicast link between the remote UE and the relay UE for a relay service, an RLC channel mapping between the one or more RLC channels of the sidelink unicast link and the link with the network entity, or data routing information associated with the relay service; configure the one or more RLC channels for the sidelink unicast link and the link with the network entity based at least in part on the configuration information; and relay communications between the remote UE and the network entity based at least in part on the configuration information.

In some aspects, a network entity for wireless communication may include a memory and one or more processors coupled to the memory. The memory and the one or more processors may be configured to transmit, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service; and communicate with the remote UE via the relay UE based at least in part on the configuration information.

In some aspects, a remote user equipment for wireless communication may include a memory and one or more processors coupled to the memory. The memory and the one or more processors may be configured to establish a sidelink unicast link with a relay UE via a sidelink signaling interface; configure one or more radio link control (RLC) channels for the sidelink unicast link based at least in part on configuration information, wherein the configuration information includes at least one of: remote UE link identifier information associated with the sidelink unicast link between the remote UE and the relay UE for a relay service, or a configuration for one or more RLC channels, including RLC channel identifier information, wherein the configuration of the one or more RLC channels is for the sidelink unicast link between the remote UE and the relay UE; and communicate with a network entity via the relay UE based at least in part on the configuration information.

In some aspects, a non-transitory computer-readable medium may store one or more instructions for wireless communication. The one or more instructions, when executed by one or more processors of a relay UE, may cause the one or more processors to establish a sidelink unicast link with a remote UE via a sidelink signaling interface; receive, from a network entity, configuration information comprising at least one of: remote UE link identifier information associated with the sidelink unicast link between the remote UE and the relay UE for a relay service, an RLC channel mapping between the one or more RLC channels of the sidelink unicast link and the link with the network entity, or data routing information associated with the relay service; configure the one or more RLC channels for the sidelink unicast link and the link with the network entity based at least in part on the configuration information; and relay communications between the remote UE and the network entity based at least in part on the configuration information.

In some aspects, a non-transitory computer-readable medium may store one or more instructions for wireless communication. The one or more instructions, when executed by one or more processors of a network entity, may cause the one or more processors to transmit, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service; and communicate with the remote UE via the relay UE based at least in part on the configuration information.

In some aspects, a non-transitory computer-readable medium may store one or more instructions for wireless communication. The one or more instructions, when executed by one or more processors of a remote UE, may cause the one or more processors to establish a sidelink unicast link with a relay UE via a sidelink signaling interface; configure one or more radio link control (RLC) channels for the sidelink unicast link based at least in part on configuration information, wherein the configuration information includes at least one of: remote UE link identifier information associated with the sidelink unicast link between the remote UE and the relay UE for a relay service, or a configuration for one or more RLC channels, including RLC channel identifier information, wherein the configuration of the one or more RLC channels is for the sidelink unicast link between the remote UE and the relay UE; and communicate with a network entity via the relay UE based at least in part on the configuration information.

In some aspects, an apparatus for wireless communication may include means for establishing a sidelink unicast link with a remote UE via a sidelink signaling interface; means for receiving, from a network entity, configuration information comprising at least one of: remote UE link identifier information associated with the sidelink unicast link between the remote UE and the apparatus for a relay service, an RLC channel mapping between the one or more RLC channels of the sidelink unicast link and the link with the network entity, or data routing information associated with the relay service; means for configuring the one or more RLC channels for the sidelink unicast link and the link with the network entity based at least in part on the configuration information; and means for relaying communications between the remote UE and the network entity based at least in part on the configuration information.

In some aspects, an apparatus for wireless communication may include means for transmitting, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service; and means for communicating with the remote UE via the relay UE based at least in part on the configuration information.

In some aspects, an apparatus for wireless communication may include means for establishing a sidelink unicast link with a relay UE via a sidelink signaling interface; means for configuring one or more radio link control (RLC) channels for the sidelink unicast link based at least in part on configuration information, wherein the configuration information includes at least one of: remote UE link identifier information associated with the sidelink unicast link between the apparatus and the relay UE for a relay service, or a configuration for one or more RLC channels, including RLC channel identifier information, wherein the configuration of the one or more RLC channels is for the sidelink unicast link between the remote UE and the relay UE; and means for communicating with a network entity via the relay UE based at least in part on the configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
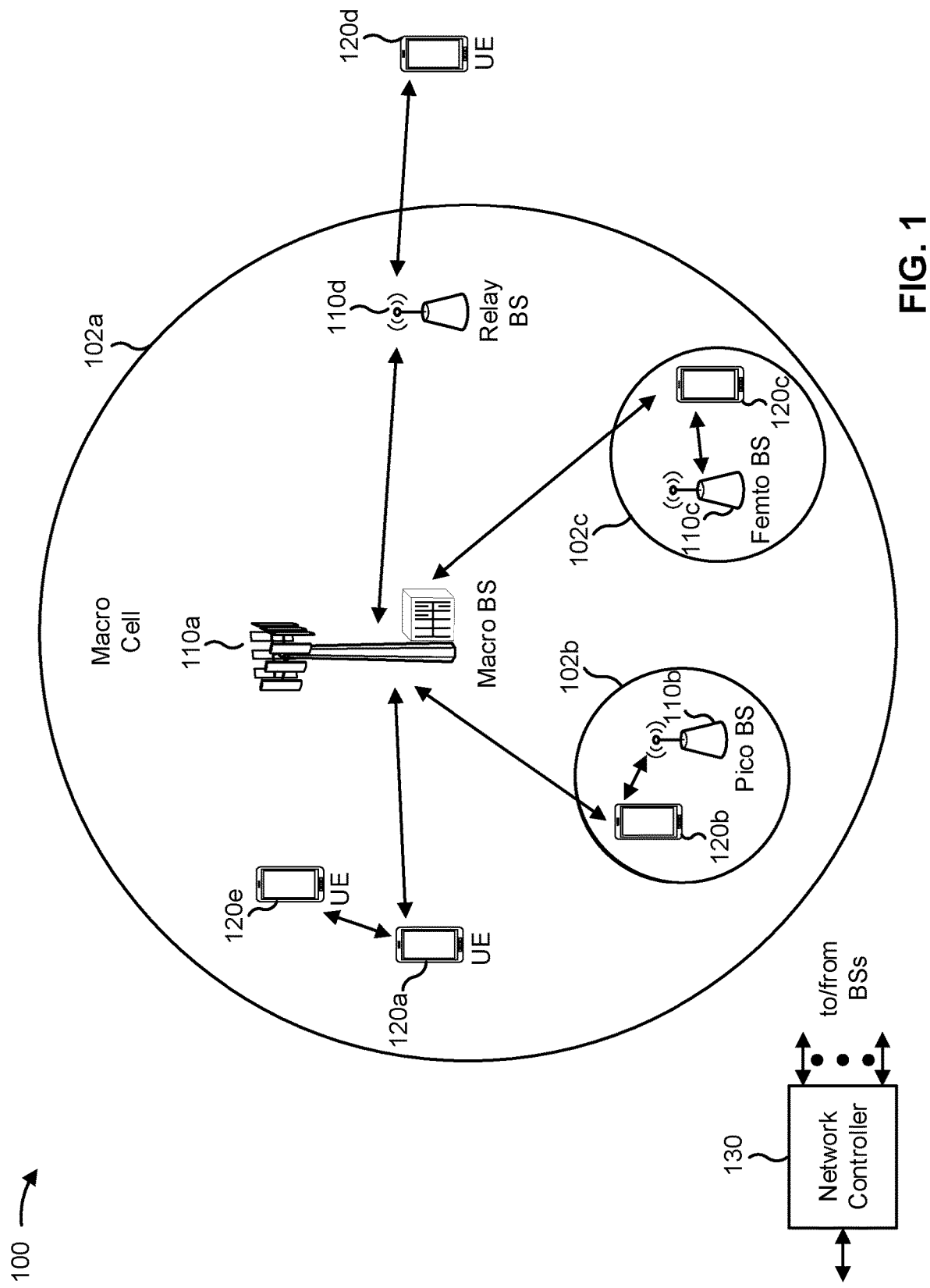
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used. Generally, "BS" may be used interchangeably with next generation radio access network (NG-RAN) herein. References herein to a BS should be understood to refer to a network entity or NG-RAN unless explicitly indicated otherwise.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
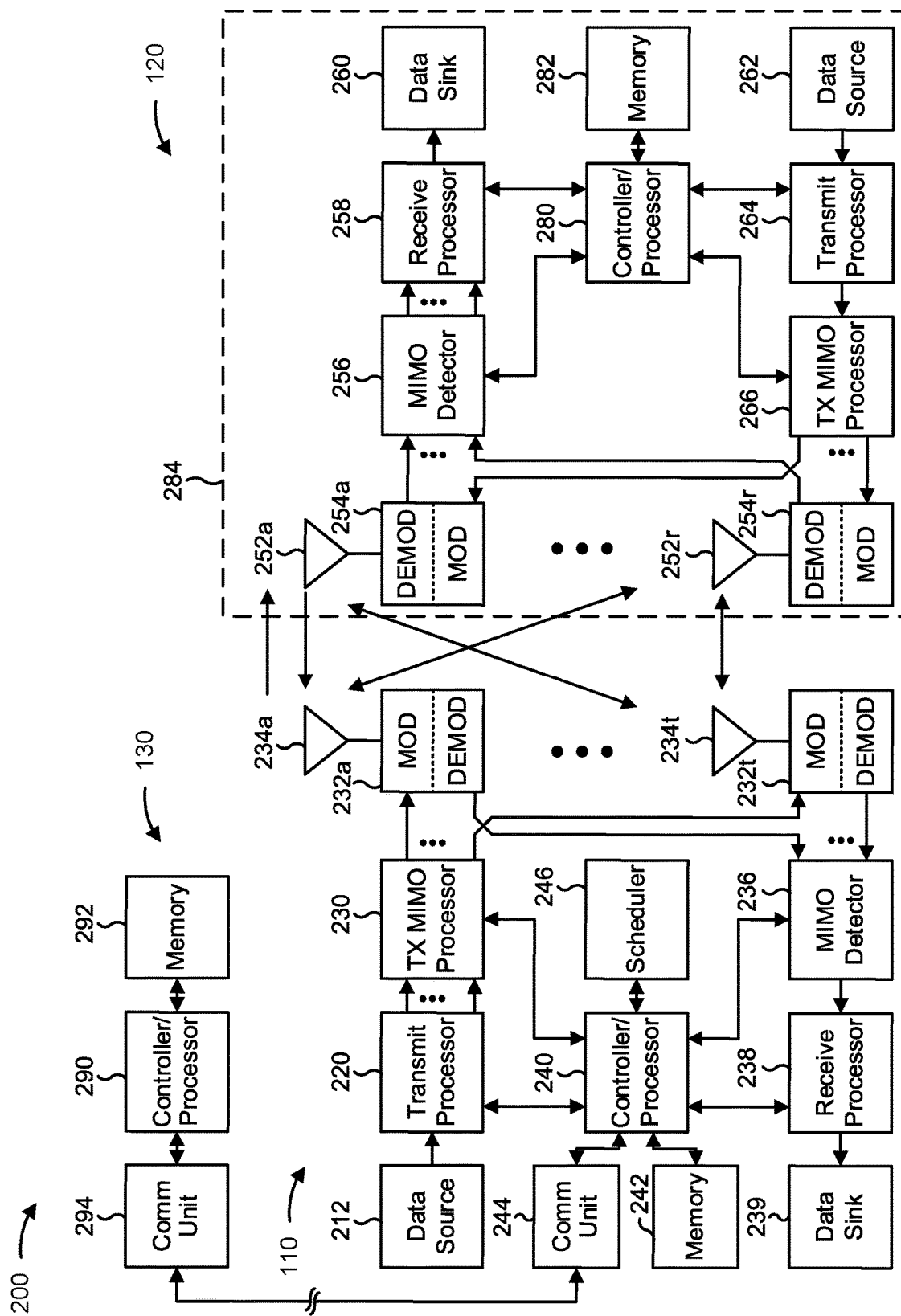
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-20).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-20).

Controller/processor 240 of base station 110, controller/processor 280 of UE 120, and/or any other component(s) of FIG. 2 may perform one or more techniques associated with relay adaptation protocol (RAP) layer configuration, as described in more detail elsewhere herein. For example, controller/processor 240 of base station 110, controller/processor 280 of UE 120, and/or any other component(s) of FIG. 2 may perform or direct operations of, for example, process 1700 of FIG. 17, process 1800 of FIG. 18, process 1900 of FIG. 19, process 2000 of FIG. 20, process 2100 of FIG. 21, process 2200 of FIG. 22, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1700 of FIG. 17, process 1800 of FIG. 18, process 1900 of FIG. 19, process 2000 of FIG. 20, process 2100 of FIG. 21, process 2200 of FIG. 22, and/or other processes as described herein. In some aspects, executing instructions may include running the instructions, converting the instructions, compiling the instructions, and/or interpreting the instructions, among other examples.

In some aspects, UE 120 may include means for establishing a sidelink unicast link with a remote UE via a sidelink signaling interface; means for receiving, from a network entity, configuration information comprising at least one of: remote UE link identifier information associated with the sidelink unicast link between the remote UE and the relay UE for a relay service, an RLC channel mapping between the one or more RLC channels of the sidelink unicast link and the link with the network entity, or data routing information associated with the relay service; means for configuring the one or more RLC channels for the sidelink unicast link and the link with the network entity based at least in part on the configuration information; means for relaying communications between the remote UE and the network entity based at least in part on the configuration information; means for establishing a sidelink unicast link with a relay UE via a sidelink signaling interface; means for configuring one or more radio link control (RLC) channels for the sidelink unicast link based at least in part on configuration information, wherein the configuration information includes at least one of: remote UE link identifier information associated with the sidelink unicast link between the remote UE and the relay UE for a relay service, or a configuration for one or more RLC channels, including RLC channel identifier information, wherein the configuration of the one or more RLC channels is for the sidelink unicast link between the remote UE and the relay UE; means for communicating with a network entity via the relay UE based at least in part on the configuration information and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service; means for communicating with the remote UE via the relay UE based at least in part on the configuration information; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
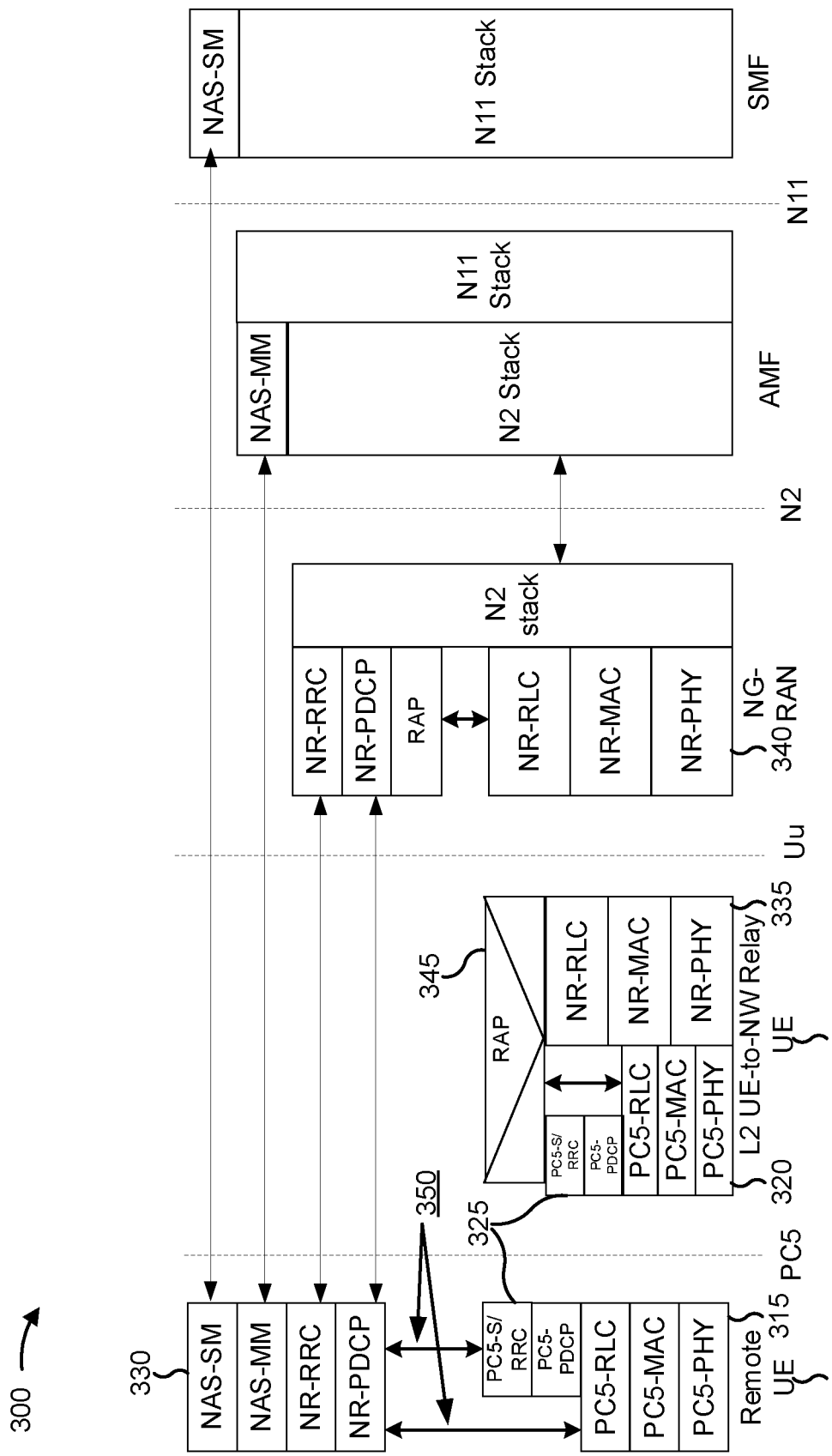
FIG. 3 is a diagram illustrating an example of a control-plane protocol architecture for a Layer 2 UE-to-network relay, in accordance with the present disclosure.
Figure 4:
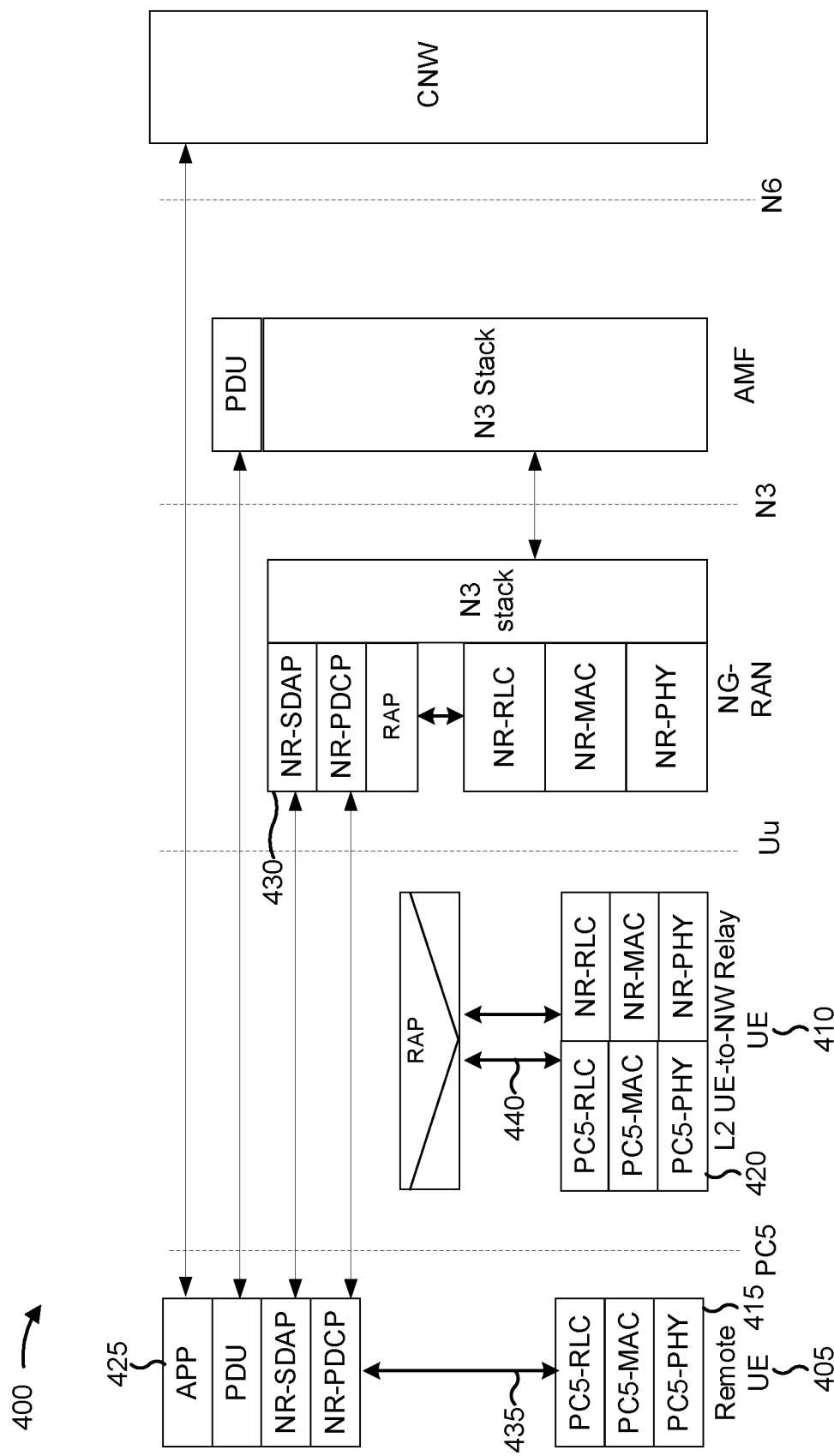
FIG. 4 is a diagram illustrating an example of a user-plane protocol architecture for a Layer 2 UE-to-network relay, in accordance with the present disclosure.

FIG. 3 is a diagram illustrating an example of a control-plane protocol architecture 300 for a Layer 2 UE-to-network relay, in accordance with the present disclosure. FIG. 4 is a diagram illustrating an example of a user-plane protocol architecture 400 for a Layer 2 UE-to-network relay, in accordance with the present disclosure. For example, the control-plane protocol architecture 300 and the user-plane protocol architecture 400 may correspond to a remote UE (e.g., UE 120) shown by reference numbers 305 and 405 and a relay UE (e.g., UE 120) shown by reference numbers 310 and 410.

As shown in FIG. 3, in the control-plane, there may be a PC5 interface (e.g., a sidelink interface) between the remote UE and the relay UE, a Uu interface between the relay UE and a next generation radio access network (NG-RAN), also referred to herein as a 5G access network (5G-AN)), an N2 interface between the NG-RAN and an access and mobility management function (AMF) of the control-plane protocol architecture 300, and an N11 interface between the AMF and a session management function (SMF).

As shown in FIG. 4, there may be an N3 interface between the NG-RAN and a user-plane function (UPF) of the user-plane protocol architecture 400, and an N6 interface between the UPF and a core network (CNW).

As further shown, the remote UE and the relay UE may be associated with respective PC5 protocol stacks 315/320 and 415/420, enabling communication on the PC5 interface between the remote UE and the relay UE. The PC5 protocol stack may include a PC5 radio link control (RLC) component, a PC5 medium access control (MAC) component, a PC5 physical (PHY) component, and/or the like. "PC5" is generally referred to herein as "sidelink" (e.g., sidelink signaling interfaces, sidelink unicast link, sidelink RLC channels, and/or the like). Communications between the remote UE and the relay UE using the PC5 interface may be referred to as sidelink communications. The respective PC5 protocol stacks may be associated with one or more of PC5-S entities, PC5-radio resource control (RRC) entities, or PC5-PDCP entities, as shown by reference number 325. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks 315/320 and 415/420 may not include PC5-S entities or PC5-RRC entities. Also, in some cases, the NG-RAN may handle control signaling and configuration of the sidelink connection.

As shown by reference number 330 of FIG. 3, the remote UE is associated with a non-access stratum (NAS) stack, which includes an NAS session management (NAS-SM) component, an NAS session management (NAS-SM) component, and one or more radio access components (e.g., an NR-RRC component and an NR-PDCP component). As shown by reference number 335 of FIG. 3, the relay UE is associated with a radio access stack, including an NR-RLC component, an NR-MAC component, and an NR-PHY component. Furthermore, the NG-RAN is associated with a radio access interface stack shown by reference number 340, which includes an NR-RLC component, an NR-MAC component, an NR-PHY component, an NR-RRC entity, and an NR-PDCP entity.

The adaptation layer entity of the relay UE, shown by reference number 345, may handle relaying from the remote UE to the network or from the network to the remote UE. As used herein, "the network" may refer to any one or more of the NG-RAN, the AMF, the SMF, the UPF, or the core network (CNW). The CNW may be referred to as a 5G core (5GC). In some aspects, the adaptation layer is referred to as an adaptation layer entity. In some aspects, the adaptation layer entity may be a separate entity between a radio link control (RLC) entity and a packet data convergence entity. In some aspects, the adaptation layer entity may be logically part of the packet data convergence entity or the radio link control entity Communication between stacks of the remote UE is indicated by the lines shown by reference number 350. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE.

The line between the NR-PDCP entity and the PC5-S or PC5-RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages.

As shown by reference number 425 of FIG. 4, the remote UE is associated with a user-plane protocol stack, which may include an application (APP) component, a protocol data unit (PDU) component, an NR-SDAP component, and an NR-PDCP component. Furthermore, the NG-RAN is associated with user-plane components shown by reference number 430, which include an NR-SDAP component and an NR-PDCP component. The NR-SDAP component and the NR-PDCP component may be referred to herein as radio access entities.

NR user-plane traffic (shown by a line indicated by "NR UP") may be transported between the NR-PDCP entity and the PC5-RLC component, as shown by reference number 435. Such NR user-plane traffic may be transported to the relay UE via one or more bearers, such as a data radio bearer (DRB) or signaling radio bearer (SRB). DRBs and SRBs can also be referred to as radio bearers or radio access bearers. As shown by reference number 440, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown).

The physical layer may offer, to the MAC sublayer, transport channels. The MAC sublayer may offer, to the RLC sublayer, logical channels. The RLC sublayer may offer, to the PDCP sublayer, RLC channels. The PDCP sublayer may offer, to the SDAP sublayer, radio bearers. The SDAP sublayer may offer, to the CNW, QoS flows. The RAP layer may handle the mapping of these types of flows, channels, and bearers to each other to facilitate Layer 2 relay services, as described elsewhere herein. In some aspects, the RAP layer may be referred to as an adaptation layer, a relay adaption layer, and/or the like. A radio access bearer may include an SRB, a DRB, and/or the like. An RLC channel can also be referred to as an RLC bearer. In such a case, an RLC channel identifier associated with the RLC channel may be referred to as an RLC bearer identifier.

As indicated above, FIGS. 3 and 4 are provided as examples. Other examples may differ from what is described with respect to FIGS. 3 and 4.

A UE (referred to herein as a relay user equipment or relay UE) may relay communications from another UE (referred to herein as a remote user equipment or remote UE) to a network or from the network to the remote UE. In some aspects, the relay UE may perform Layer 2 UE-to-network relaying, in which an adaptation layer in the Layer 2 stack of the relay UE performs forwarding of the remote UE's communications, as compared to Layer 3 relaying which may occur in the Internet Protocol (IP) layer. Communications between the relay UE and the remote UE may be referred to herein as sidelink communications. In some Layer 2 UE-to-network relaying applications, non-access-stratum (NAS) and RRC messages may be transparently transferred between the remote UE and the network using packet data convergence protocol (PDCP) end-to-end connections.

The ProSe Sidelink (PC5) interface may provide a sidelink interface between UEs. For example, Vehicle-to-Anything (V2X) communications in accordance with NR Release 16 may be performed using a PC5 unicast control-plane stack, which may include a PC5 signaling (PC5-S) interface and a PC5 access-stratum (AS) (PC5-AS) interface, such as a PC5-RRC interface. UEs communicating using the PC5 interface may configure a sidelink unicast link context and exchange AS information using the PC5-S interface and the PC5-RRC interface. The UEs may be associated with a PC5 user-plane stack, which may include, for example, a PC5-service data adaptation protocol (SDAP) entity, a PC5-PDCP entity, and/or the like.

Traffic flows may be associated with various quality of service (QoS) requirements, relay services, and security settings. Furthermore, a relay UE may provide a Layer 2 relay service for one or more remote UEs, which may be associated with respective traffic flows, RLC channels, bearers, and so on. Therefore, challenges may arise in the relaying of communications between one or more remote UEs and the network, such as how to handle traffic with varying QoS requirements, how to map radio access RLC channels to sidelink RLC channels, how to handle radio access bearers such as signaling radio bearers and data radio bearers, how to handle relaying for multiple remote UEs, and so on, which may complicate the Layer 2 relay service. Furthermore, a remote UE may shift between connected/idle/inactive states and/or between in-coverage and out-of-coverage states, or may be handed over from a radio access link to a sidelink unicast link or vice versa, which may further complicate the Layer 2 relay service.

Some techniques and apparatuses described herein provide configuration of a relay adaptation protocol (RAP) layer to support Layer 2 relaying by a relay UE. The RAP layer may be between the RLC layer and the PDCP layer or can be part of the PDCP layer or RLC layer. The RAP layer may support data transfer, bearer mapping, and data routing associated with a Layer 2 relay service. The RAP layer may be configured by a BS (as the relay UE may be within coverage of the BS). Some techniques and apparatuses described herein provide signaling for configuration of the RAP layer, configuration of radio bearer mappings, privacy and security support, and traffic routing. Thus, a Layer 2 relay service is configured to handle QoS requirements, one or more remote UEs, various service coverage and connection states, and mappings of radio bearers, RLC channels, and so on. In this way, efficiency of Layer 2 relaying is improved and conformance with QoS requirements is improved.

Figure 5:
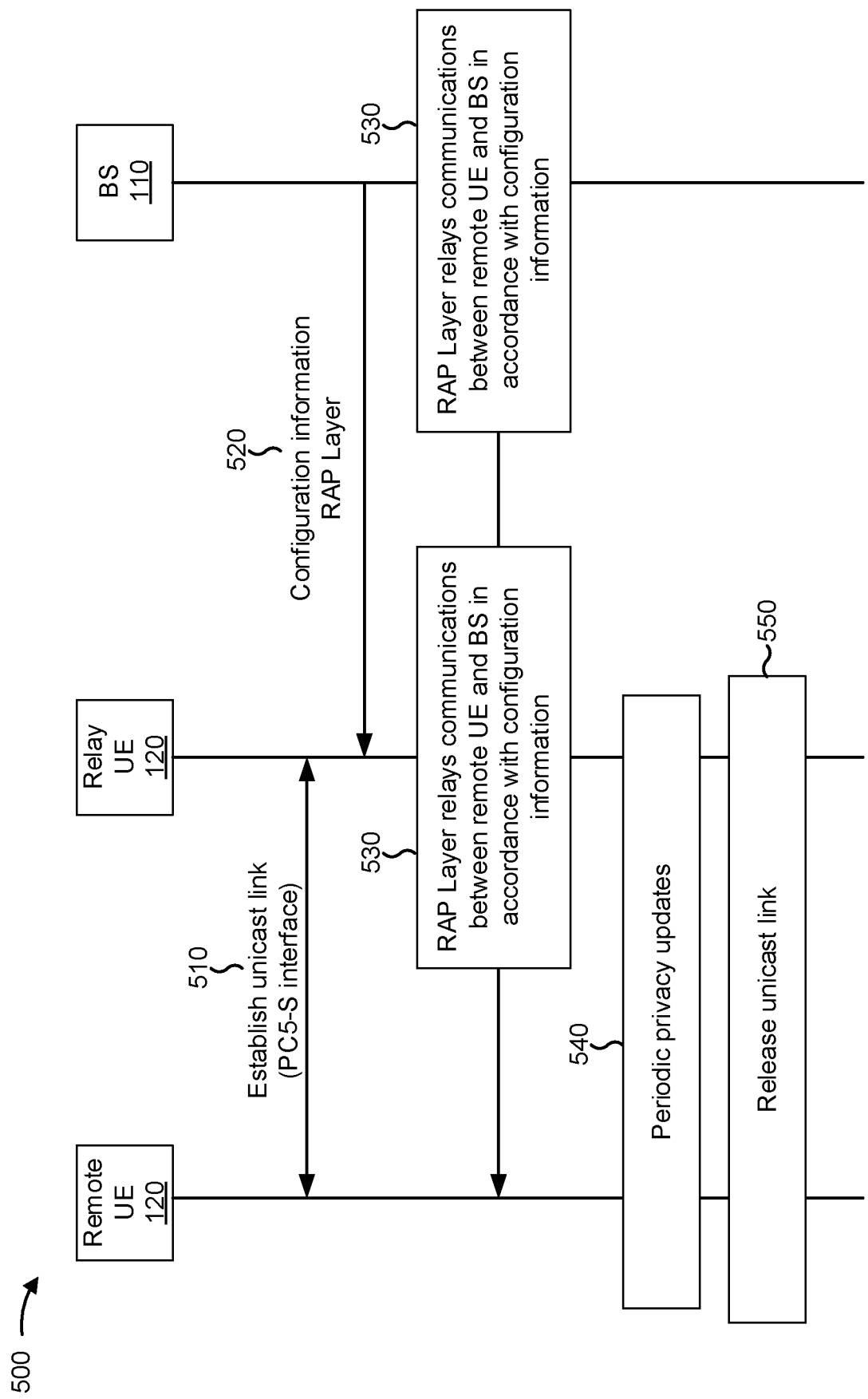
FIG. 5 is a diagram illustrating an example 500 of configuring a RAP layer for a Layer 2 relay service, in accordance with the present disclosure.

FIG. 5 is a diagram illustrating an example 500 of configuring a RAP layer for a Layer 2 relay service, in accordance with the present disclosure. As shown, example 500 includes a relay UE 120, a remote UE 120, and a BS 110. "BS 110" may be used to refer to a base station, a gNB, an NG-RAN, or a network entity.

The examples of FIGS. 5-16 are described in the context of a connection between the remote UE 120 and the relay UE 120 that is a sidelink unicast link. However, the examples of FIGS. 5-16 can be implemented using other forms of connections, such as using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol). Furthermore, the examples of FIGS. 5-16 can be implemented using a Bluetooth connection, a WiFi connection, or the like.

As shown by reference number 510, the relay UE 120 and the remote UE 120 may establish a sidelink unicast link via a sidelink signaling interface (e.g., a PC5-S interface). In some aspects, the sidelink unicast link may be associated with an identifier. For example, the sidelink unicast link may be identified by a combination of a source Layer 2 identifier and a destination Layer 2 identifier. One of the source Layer 2 identifier and the destination Layer 2 identifier may identify the remote UE 120, and the other may identify the relay UE 120. The identifier may be used to route traffic via the Layer 2 relay, as described elsewhere herein. In some aspects, the identifier may be referred to as a unique index.

In some aspects, the sidelink unicast link may be configured for a particular Layer 2 or Layer 3 relay service. A Layer 2 or Layer 3 relay service may be associated with an identifier, referred to as a relay service code. A sidelink unicast link for a particular Layer 2 or Layer 3 relay service may be configured with a corresponding security setting that is associated with the particular relay service and/or the relay service code. In some aspects, sidelink control plane (e.g., PC5-CP) signaling may use the corresponding security setting for control-plane signaling specific to the particular relay service. In some aspects, all services associated with the relay service code (e.g., data radio bearers (DRBs) and/or signaling radio bearers (SRBs)) may use the same security setting.

In some aspects, the sidelink unicast link may support multiple sidelink RLC channels (e.g., N sidelink RLC channels, where N is an integer) for radio access SRBs and/or DRBs. In some aspects, the sidelink unicast link may support multiple radio access protocol data unit (PDU) sessions on a single link. In some aspects, the sidelink unicast link may support multiple sidelink RLC channels configured with the same QoS.

As shown by reference number 520, the relay UE 120 may receive configuration information to support the relaying of remote UE 120's traffic, including the configuration for a RAP layer of the relay UE 120. The relay UE 120 and the BS 110 may be associated with respective RAP layers. The RAP layer of a relay UE or a BS may handle bearer/RLC channel mapping (e.g., assignment of a remote UE index, determination of a radio access RLC channel corresponding to a remote UE's sidelink RLC channel, determination of a remote UE's DRB, determination of the remote UE's unicast link and the corresponding RLC channel, and so on). Additionally, or alternatively, the RAP layer may handle data transfer between the remote UE 120 and the network. Additionally, or alternatively, the RAP layer may handle data routing, such as in the case of multi-hop scenarios. In some aspects, the configuration information may indicate mappings of sidelink RLC channels to radio access RLC channels, for example, at a 1-to-1 basis or an N-to-1 basis, where N is variable and an integer.

In some aspects, the configuration information may include a configuration for one or more RLC channels. Such configuration information may include RLC channel identifier information, such as an information element that identifies RLC channel identifiers of a set of RLC channels (e.g., sidelink RLC channels and/or radio access RLC channels) associated with the relay service. Additionally, or alternatively, such information may include a set of parameters to configure corresponding RLC and MAC entities for an RLC channel.

A radio access link between the relay UE 120 and the BS 110 may be referred to as a link with the BS 110. The sidelink unicast link and the radio access link may be collectively referred to as a relaying connection.

In some aspects, the relay UE 120 may receive the configuration information via RRC signaling (e.g., NR RRC signaling). For example, an NR RRC message may include information associated with RAP layer configuration setup, modification, and/or release for each remote UE connected to a relay UE for relaying services. In one example, an NR RRC setup message may include a remote UE index configuration (e.g., to identify a remote UE connected to a relay UE), an SRB/DRB mapping configuration (e.g., a bearer mapping), and/or the like. As another example, an NR RRC modification message may include an identifier update to support a privacy setting, as described elsewhere herein. As yet another example, an NR RRC release message (described elsewhere herein) may indicate to release an association between a remote UE and a relay UE.

In some aspects, as mentioned before, the configuration information may identify a bearer mapping. A bearer mapping may identify a mapping between a radio bearer (e.g., a DRB or SRB) and one or more RLC channels, radio access RLC channels, and/or remote UEs. For example, the bearer mapping may be provided via a pre-configured relaying SRB configuration. As another example, the bearer mapping may be provided by the BS 110 based at least in part on the relay UE 120 indicating support for the Layer 2 relay service. In this case, the relay UE 120 may transmit information indicating support for the Layer 2 relay service. As still another example, the BS 110 may provide a bearer mapping for a DRB based at least in part on a request from the relay UE 120 (e.g., for a remote UE 120 in an out-of-coverage (OOC) or radio access idle or inactive mode) or based at least in part on a handover of the remote UE 120 to the sidelink unicast link (e.g., from a radio access link to the sidelink unicast link).

In some aspects, the relay UE 120 may configure unicast links with multiple remote UEs 120 (e.g., M remote UEs 120, where M is an integer). In some aspects, the relay UE 120 may support multiple radio access RLC channels for relaying traffic to the multiple remote UEs 120. In some aspects, a single radio access RLC channel may be mapped to multiple sidelink RLC channels with the same QoS level. In some aspects, a single radio access RLC channel may be mapped to multiple sidelink RLC channels with different QoS levels. In this case, in some aspects, the radio access RLC channel may be assigned a highest QoS level of the different QoS levels. In other aspects, scheduling by the BS 110 and link control protocol (LCP) operations at the relay UE 120 may consider each of the QoS levels associated with the multiple sidelink RLC channels when scheduling and relaying communications.

Figure 6:
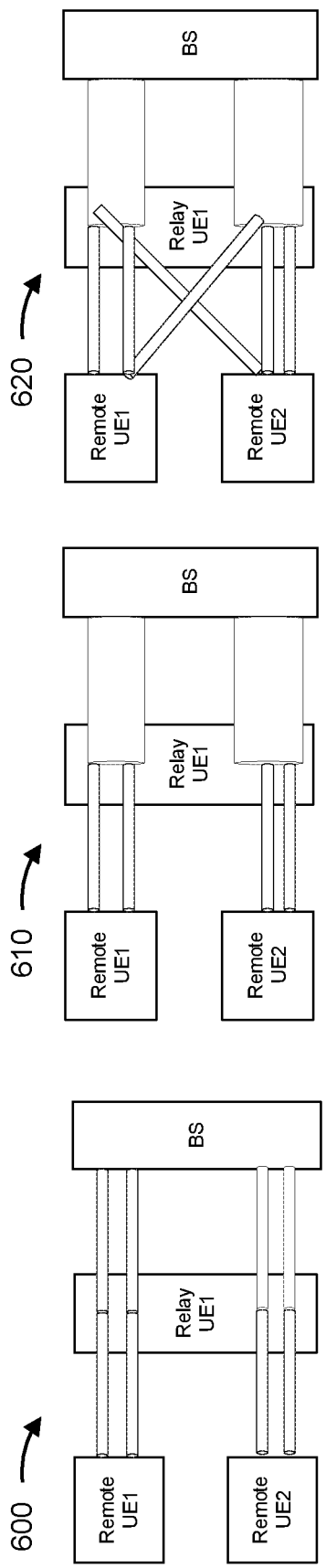
FIG. 6 is a diagram illustrating examples 600, 610, and 620 of mappings of sidelink RLC channels to radio access RLC channels, in accordance with the present disclosure.

In some aspects, the configuration information may indicate a mapping of sidelink RLC channels to radio access RLC channels. Such configuration information is referred to herein as an RLC channel mapping. The RLC channel mapping may be used to determine which RLC channel should be used to transmit or relay traffic, as described elsewhere herein. FIG. 6 is a diagram illustrating examples 600, 610, and 620 of mappings of sidelink RLC channels to radio access RLC channels. In example 600, a one-to-one-to-one mapping is configured between remote UEs, sidelink RLC channels, and radio access RLC channels. Thus, example 600 may provide a dedicated radio access RLC channel for each remote UE, and a one-to-one mapping is provided between a remote UE's sidelink RLC channel and a radio access RLC channel. In example 610, a one-to-N-to-one mapping is configured between remote UEs, sidelink RLC channels, and radio access RLC channels, where N is an integer. Thus, example 610 may provide a dedicated radio access RLC channel for each remote UE and an N-to-one mapping is provided between a remote UE's sidelink RLC channel and a radio access RLC channel. In example 620, an M-to-N-to-one mapping is configured between remote UEs, sidelink RLC channels, and radio access RLC channels, where M and N are integers, and may or may not be equal to each other. Thus, example 620 provides shared radio access RLC channels among multiple remote UEs with an N-to-one mapping between a remote UE's sidelink RLC channel and a radio access RLC channel. In some aspects, options 610 and 620 may use an enhanced logical channel identifier (eLCHID) at the relay UE 120 to improve scalability.

Returning to FIG. 5, as shown by reference number 530, the relay UE 120 and the BS 110, and the respective RAP layers, may relay communications between the remote UE 120 and the BS 110 in accordance with the configuration information. For example, the RAP layer may determine a sidelink RLC channel or radio bearer associated with traffic received via a radio access RLC channel or vice versa, and may relay traffic accordingly. As another example, the RAP layer may determine data routing and/or data transfer information for a traffic flow.

Figure 7:
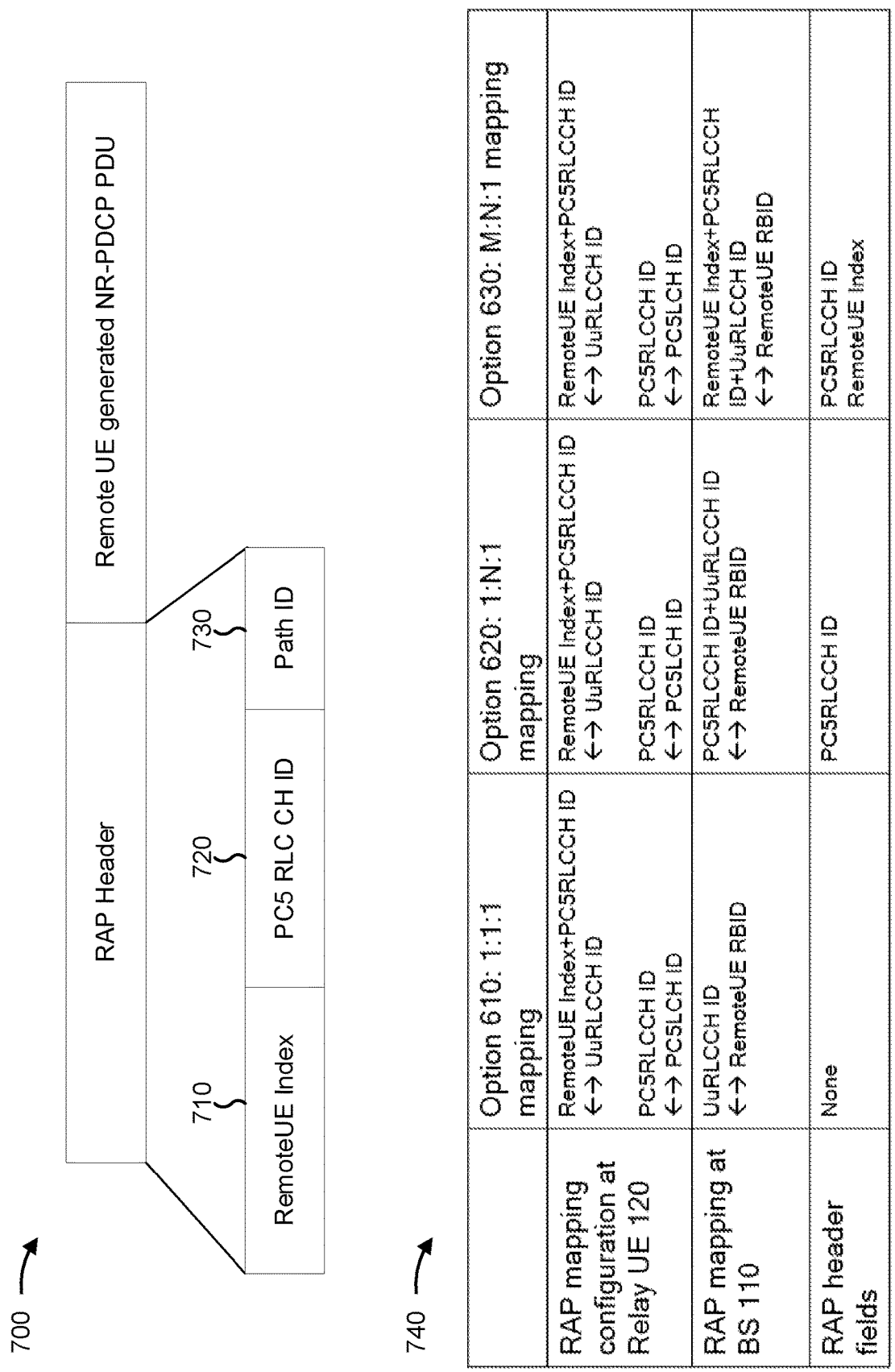
FIG. 7 is a diagram illustrating an example of a RAP header, in accordance with the present disclosure.

In some aspects, the RAP layer may use a header associated with a communication to relay the communication. FIG. 7 is a diagram illustrating an example 700 of a RAP header, in accordance with the present disclosure. The RAP header (e.g., one or more fields of the RAP header) may provide support for data routing and mapping of RLC channels to bearers associated with the remote UE 120. For example, the RAP header may include a first field 710 that identifies an identifier associated with the remote UE 120 (e.g., a remote UE index), which may be a unique index identifying the remote UE 120's unicast link with the relay UE 120. In some aspects, the unique index may include the sidelink unicast link identifier described in connection with reference number 510. As another example, the RAP header may include a second field 720 that identifies a sidelink RLC channel identifier corresponding to a radio access bearer of the remote UE 120. As yet another example, the RAP header may include a third field 730 that indicates a route over which the communication is to be relayed. For a single-hop relay or a single-relay connection, the third field 730 may not be present or may be set to a value indicating a single-hop relay or a single-relay connection (e.g., 1). As shown, the RAP header may be appended by the relay UE 120 to an NR-PDCP PDU generated by the remote UE 120 or by the BS 110 to the NR-PDCP PDU generated for the remote UE 120.

The table 740 of FIG. 7 shows mapping configurations and header fields for a single-hop relay, with reference to the example mappings shown in FIG. 6. In table 740, RemoteUE index refers to the identifier associated with the remote UE 120, PC5RLCCH ID refers to an identifier associated with a sidelink RLC channel, UuRLCCH ID refers to an identifier associated with a radio access RLC channel, PC5LCH ID refers to an identifier associated with a sidelink logical channel, and RemoteUE RBID refers to a radio bearer identifier associated with the remote UE 120. As shown by table 740, for options 610, 620, and 630, the configuration information for the relay UE 120's RAP layer may identify a mapping of a remote UE index and a sidelink RLC channel identifier to a radio access RLC channel identifier, as well as a mapping of a sidelink RLC channel identifier to a sidelink logical channel identifier. For option 610, the configuration information for the BS 110's RAP layer may identify a mapping of a radio access RLC channel identifier to the remote UE 120's radio bearer identifier. For option 620, the configuration information for the BS 110's RAP layer may identify a mapping of a sidelink RLC channel identifier and a radio access RLC channel identifier to the remote UE 120's radio bearer identifier. For option 630, the configuration information for the BS 110's RAP layer may identify a mapping of a remote UE index, a sidelink RLC channel identifier, and a radio access RLC channel identifier to the remote UE 120's radio bearer identifier. In option 620, the RAP header may identify the sidelink RLC channel identifier, and in option 630, the RAP header may identify the sidelink RLC channel identifier and the remote UE index of the remote UE 120. The BS 110 and the relay UE 120 may relay uplink or downlink data using these mappings, as described below.

For data transfer from the remote UE 120 to the network, the relay UE 120's RAP layer may perform a variety of functions using the configuration information, such as determination of a remote UE index associated with the sidelink unicast link for the remote UE 120, determination of a radio access RLC channel corresponding to a remote UE 120's sidelink RLC channel, addition of a RAP header including at least one of the Remote UE Index, a sidelink RLC channel identifier, or a path identifier to a received NR PDCP protocol data unit (PDU) from the remote UE 120, and transferring the RAP layer PDU to the radio access lower layers for transmission. The RAP layer of the BS 110 may perform a variety of functions, including determination of the remote UE 120's SRB/DRB based at least in part on the information in the RAP header for the received RAP PDU (e.g., a radio access RLC channel on which the PDU is received, a remote UE index to determine a remote UE 120 with which the PDU is associated, a sidelink RLC channel identifier to determine the radio access bearer of the remote UE 120, and/or the like), removal of the RAP header, and transferring the NR PDCP PDU to upper layers.

For data transfer from the network to the remote UE 120, the BS 110's RAP layer may perform a variety of functions including determination of a remote UE index associated with the sidelink unicast link for the remote UE 120, determination of the Remote UE 120's sidelink RLC channel corresponding to the remote UE 120's radio access bearer, determination of a radio access RLC channel corresponding to a remote UE 120's sidelink RLC channel on which to send the data, addition of a RAP header including at least one of the remote UE Index, a sidelink RLC channel identifier, or a path identifier to the received NR PDCP PDU from the remote UE 120, and transferal of the RAP layer PDU to the radio access lower layers for transmission on the determined radio access RLC channel. The relay UE 120's RAP layer may perform a variety of functions, including determination of the remote UE 120's unicast link and the corresponding sidelink RLC channel on which to relay the data based at least in part on the information in the RAP header for the received RAP PDU (e.g., a radio access RLC channel on which the PDU is received, a remote UE index to determine which remote UE 120 unicast link is associated with the PDU, and a sidelink RLC channel identifier to determine the sidelink logical channel identifier of the sidelink unicast link), removal of the RAP header, and transfer of the NR PDCP PDU to the sidelink lower layers for transmission on the determined sidelink logical channel.

In some aspects, the relay UE 120 may be part of a multi-hop relay. In the case of multi-hop relays, a relay UE 120's RAP layer and/or a BS 110's RAP layer may perform determination of a path for routing data based at least in part on a on routing configuration, determination of a next hop destination based at least in part on the routing configuration, and addition of a path identifier in a RAP header based at least in part on the next hop determination.

Returning to FIG. 5, in some aspects, the relay UE 120 may relay SRB or DRB traffic over a relay path. For example, a sidelink SRB may be used for sidelink control plane signaling. One or more access stratum SRBs, such as SRB0 (which may be for RRC messages using a common control channel), SRB1 (which may be for RRC messages and NAS messages prior to establishment of SRB2), SRB2 (which may be for RRC messages that include logged measurement information as well as NAS messages after security activation), and/or SRB3 (which may be for RRC messages in dual connectivity such as over radio access and sidelink links) may be set up for an NR connection. One or more access stratum DRBs and/or PDU sessions may be set up to satisfy a QoS level associated with the Layer 2 relay service.

In some aspects, separate sidelink RLC channels may be configured for each radio access SRB. For example, a UE may have six logical channels corresponding to six SRBs—two sidelink signaling interface logical channels, a sidelink RRC logical channel, and radio access SRB0, SRB1, and SRB2. Additionally, or alternatively, multiple radio access SRBs may be multiplexed on a single sidelink RLC channel, which may reduce the number of sidelink channels configured for the remote UE 120. In this case, a RAP layer on the remote UE 120 may indicate a radio access SRB index associated with one or more radio access SRBs of the remote UE 120. In some aspects, separate sidelink RLC channels may be configured for each radio access DRB.

In some aspects, if the relay UE 120 performs a Layer 2 relay service for multiple remote UEs 120, then the relay UE 120 may configure separate radio access RLC channels to multiplex SRB traffic from the multiple remote UEs 120 (e.g., such as in example 620 of FIG. 6). In some aspects, radio access RLC channels for DRBs may be configured as shown in any one or more of examples 600, 610, and 620 of FIG. 6.

In some aspects, the configuration information may be based at least in part on a backhaul adaptation protocol (BAP) to support wireless backhaul. For example, the relay UE 120 may be considered a wireless relay node or an integrated access backhaul node. In this case, the remote UE index and the relay node BAP address may be provided via RRC signaling. In some aspects, a multi-hop relaying routing configuration may be provided via RRC signaling. In some aspects, additional backhaul routing configurations can be provided via RRC signaling. In some aspects, a bearer mapping, such as a sidelink RLC channel to radio access RLC channel mapping configuration, may be provided via RRC signaling. In some aspects, the relay UE 120 may indicate flow control feedback to the BS 110 via a BAP CONTROL PDU, based at least in part on polling or a buffer load satisfying a threshold. In this case, the relay UE 120 may include a radio access RLC channel identifier and a routing identifier for which the feedback is provided. In some aspects, the relay UE 120 may transmit a BAP CONTROL PDU to indicate a radio link failure (RLF) notification to a child node (e.g., the remote UE 120 or another relay UE 120) in the case of a multi-hop relay.

Figure 8:
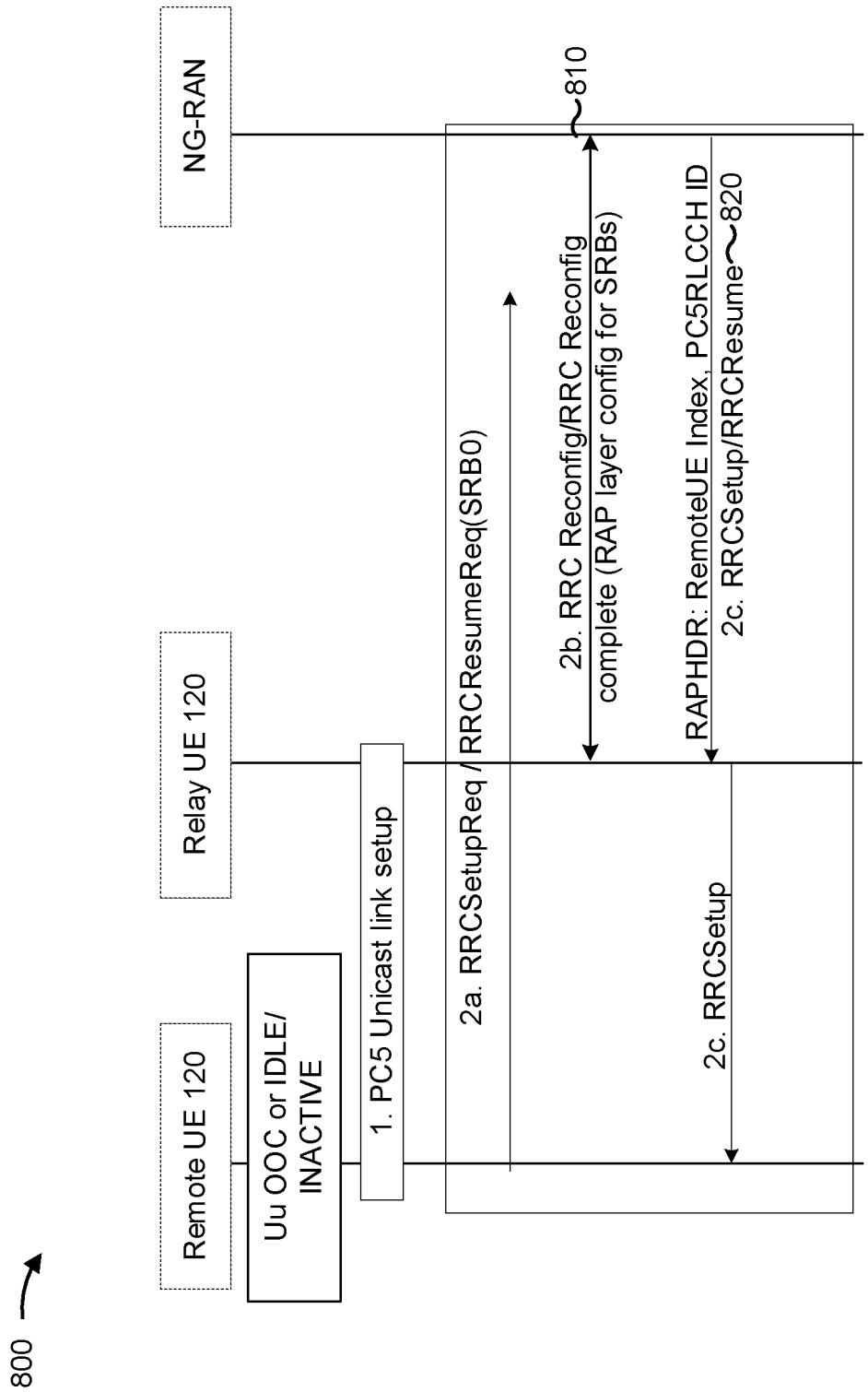
FIG. 8 is a diagram illustrating an example of signaling associated with traffic-triggered SRB configuration for an out-of-coverage (OOC), idle, or inactive UE, in accordance with the present disclosure.

In some aspects, the remote UE 120 may be in an OOC state, an idle state (e.g., an RRC idle state), or an inactive state (e.g., an RRC inactive state). FIG. 8 is a diagram illustrating an example 800 of signaling associated with traffic-triggered SRB configuration for an OOC, idle, or inactive UE, in accordance with the present disclosure. As shown in FIG. 8, in a first step, the remote UE 120 and the relay UE 120 may perform unicast link setup, as is described in connection with reference number 510. In a second step (step 2a), the remote UE 120 may transmit, to an NG-RAN via the relay UE 120, an RRC setup message or an RRC resume request. For example, the remote UE 120 may provide such a message on SRB0 based at least in part on the remote UE 120 having traffic to provide via the RRC connection.

As shown by reference number 810, the BS 110 may provide, to the relay UE 120, an RRC message such as an RRC reconfiguration message. The relay UE 120 may reply to the RRC reconfiguration message with an RRC reconfiguration complete message. As further shown, the RRC message may include configuration information for the RAP layer. For example, the RRC message may include the configuration information based at least in part on the remote UE 120's RRC setup request or RRC resume request. As shown by reference number 820, the BS 110 may provide, to the relay UE 120 in association with an RRC setup message or an RRC resume message, a RAP header (shown as RAPHDR). The RAP header may indicate a remote UE index of the remote UE 120 and a sidelink RLC channel ID associated with the remote UE 120. Thus, the relay UE 120 may forward the RRC setup message or the RRC resume message to the remote UE 120. In some aspects, the message shown by reference number 810 may include an RLC mapping configuration, such as a mapping of a sidelink RLC channel to a radio access RLC channel for a specific Remote UE index, a routing configuration (e.g., if backhaul-based routing such as BAP is used), and/or the like. In some aspects, the BS 110 may provide a radio access RLC channel configuration (e.g., via a radio access RLC channel identifier field assigned by the BS 110), a sidelink RLC channel configuration (e.g., via a sidelink RLC channel identifier field assigned by the BS 110), and/or the like in the same message 810 or in a separate message sent to the Relay UE to set up the relaying bearers.

Figure 9:
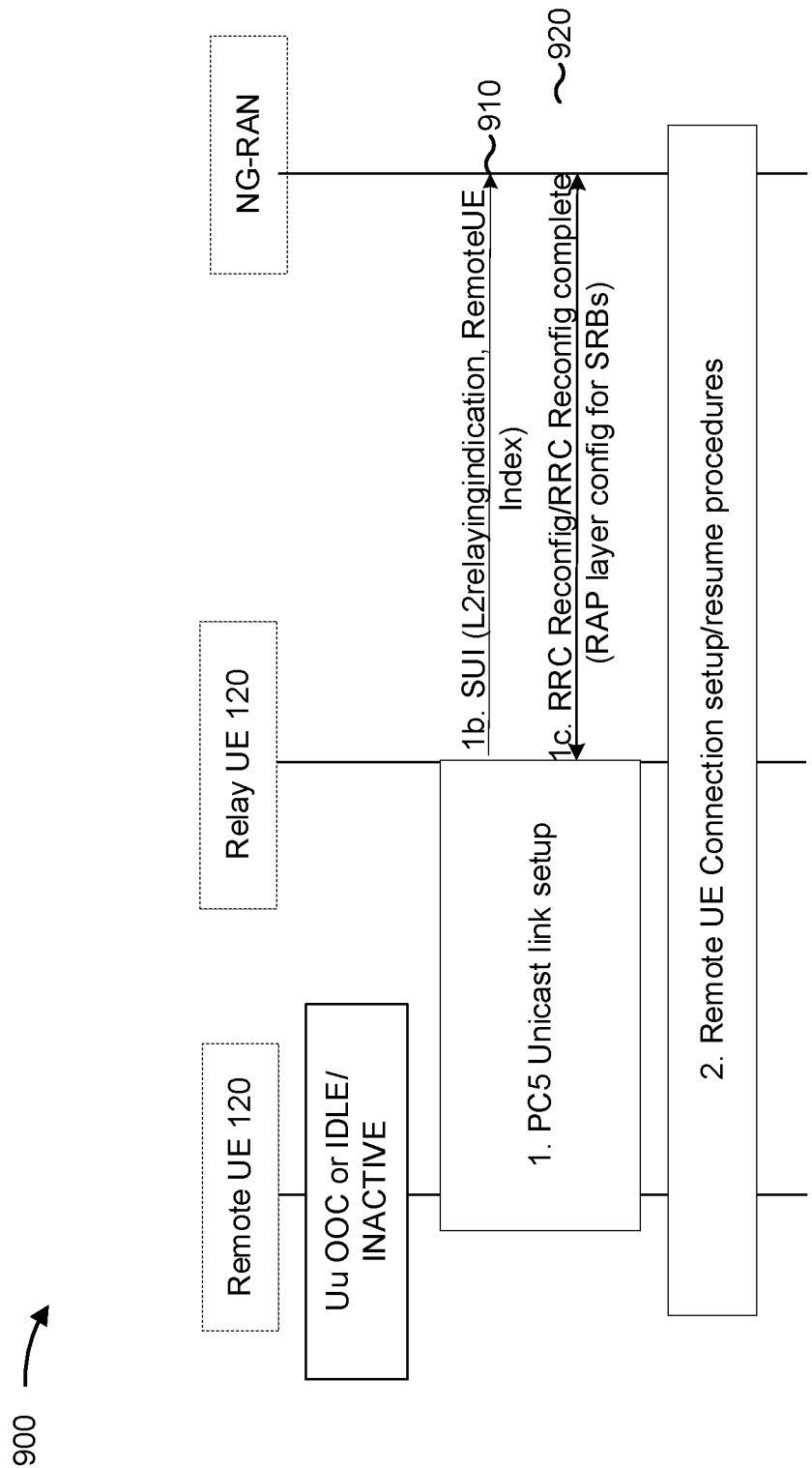
FIG. 9 is a diagram illustrating an example of signaling associated with UE-triggered SRB configuration for an OOC, idle, or inactive remote UE, in accordance with the present disclosure.

FIG. 9 is a diagram illustrating an example 900 of signaling associated with UE-triggered SRB configuration for an OOC, idle, or inactive remote UE, in accordance with the present disclosure. In example 900, the relay UE 120 triggers SRB configuration (e.g., via a sidelink UE Information NR message (SUI) or another RRC message such as UEAssistanceInformation sent to the NG-RAN), as shown by reference number 910. The relay UE 120 may assign a Remote UE Index and indicate the Remote UE index in the RRC message sent to the NG-RAN. Accordingly, as shown by reference number 920, the NG-RAN may provide configuration information relating to one or more SRBs. This information may include any of the information described in connection with FIG. 8.

Figure 10:
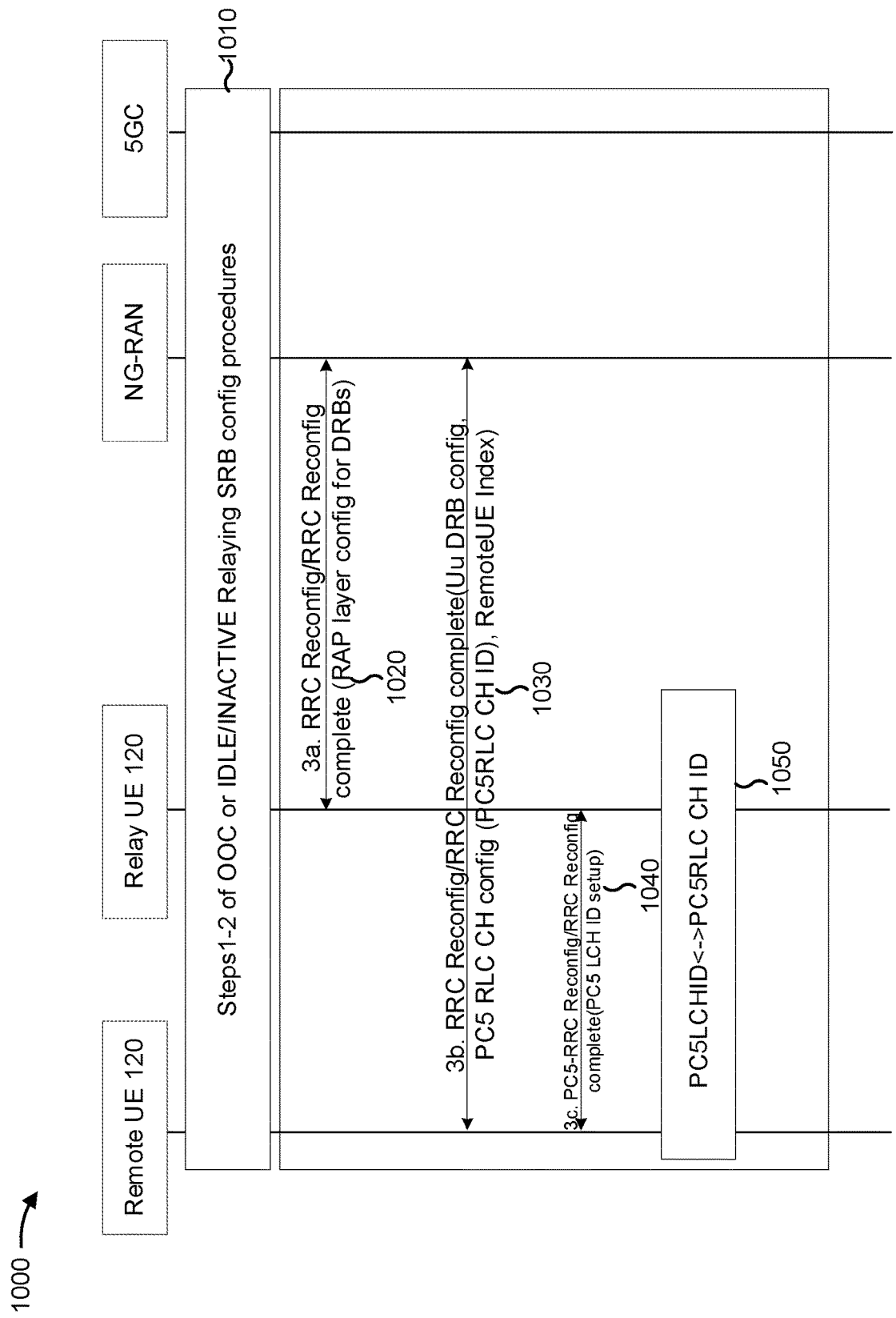
FIG. 10 shows an example of signaling associated with DRB configuration for an OOC, idle, or inactive remote UE, in accordance with the present disclosure.

FIG. 10 shows an example 1000 of signaling associated with DRB configuration for an OOC, idle, or inactive remote UE, in accordance with the present disclosure. As shown in FIG. 10, and by reference number 1010, the remote UE 120, the relay UE 120, the NG-RAN, and/or a 5GC may perform the operations described with regard to FIGS. 8 and/or 9. As shown by reference number 1020, the NG-RAN may provide, to the remote UE 120, configuration information that indicates a bearer mapping for one or more DRBs associated with the remote UE, a mapping of one or more sidelink RLC channels to one or more radio access RLC channels, a routing configuration, and/or the like. As shown by reference number 1030, the NG-RAN may provide, to the remote UE 120 via the relay UE 120, a bearer mapping that indicates a radio access DRB configuration, a sidelink RLC channel configuration (e.g., based at least in part on a sidelink RLC channel configuration), an index associated with the remote UE 120 (e.g., for data relay or data forwarding by the relay UE 120), and/or the like. As shown by reference number 1040, the relay UE 120 and the remote UE 120 may exchange sidelink RLC channel identifiers via PC5-RRC messages to use the same configuration provided by the BS for the associated sidelink logical channel. As shown by reference number 1050, the relay UE 120 and the remote UE 120 may map the sidelink RLC channel identifiers to respective sidelink logical channels (e.g., based at least in part on sidelink logical channel identifiers) to support data transfer on the associated radio access bearers and RLC channels.

Figure 11:
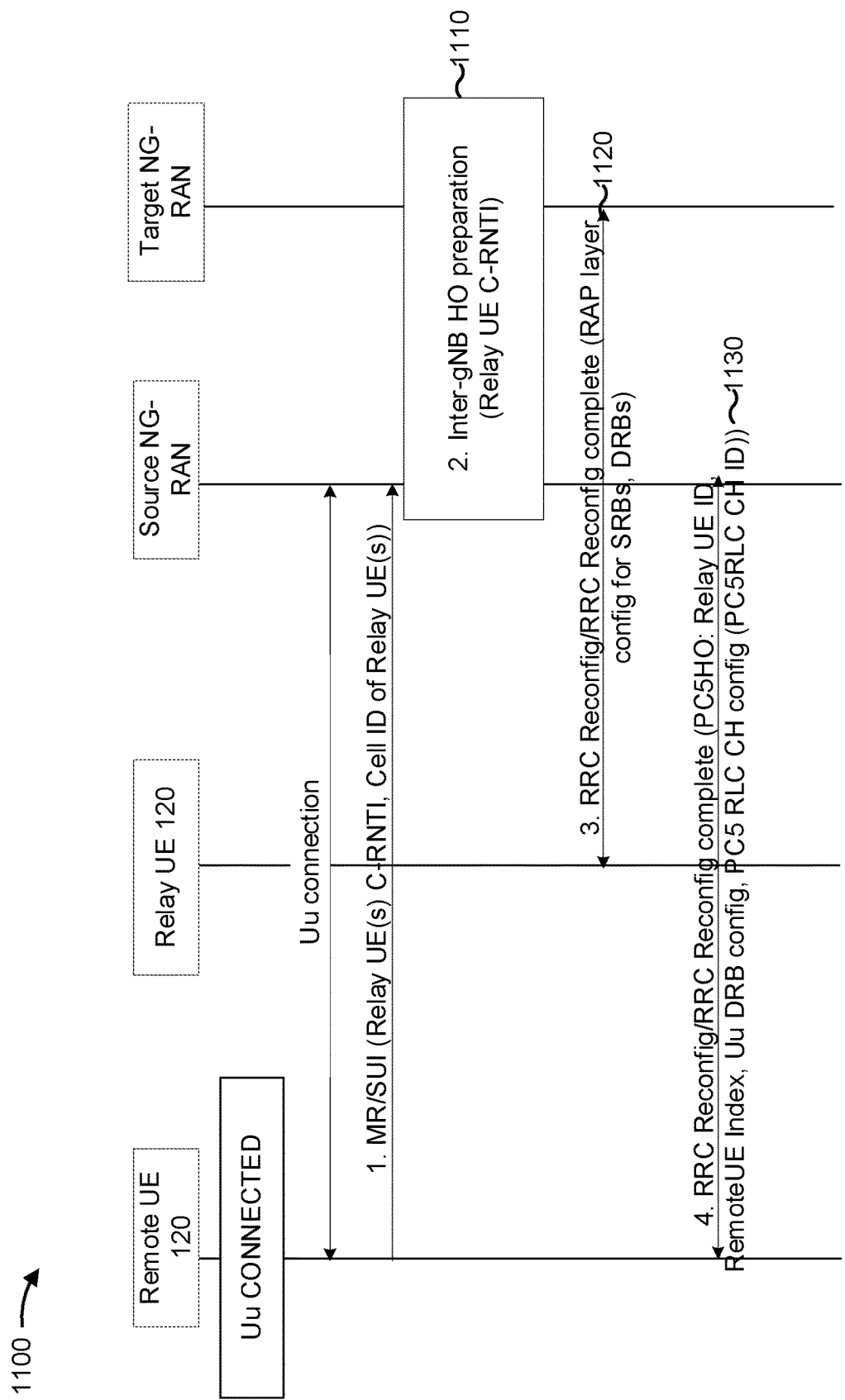
FIGS. 11 and 12 show examples of configuration of SRBs and/or DRBs for a remote UE in a connected mode, in accordance with the present disclosure.
Figure 12:
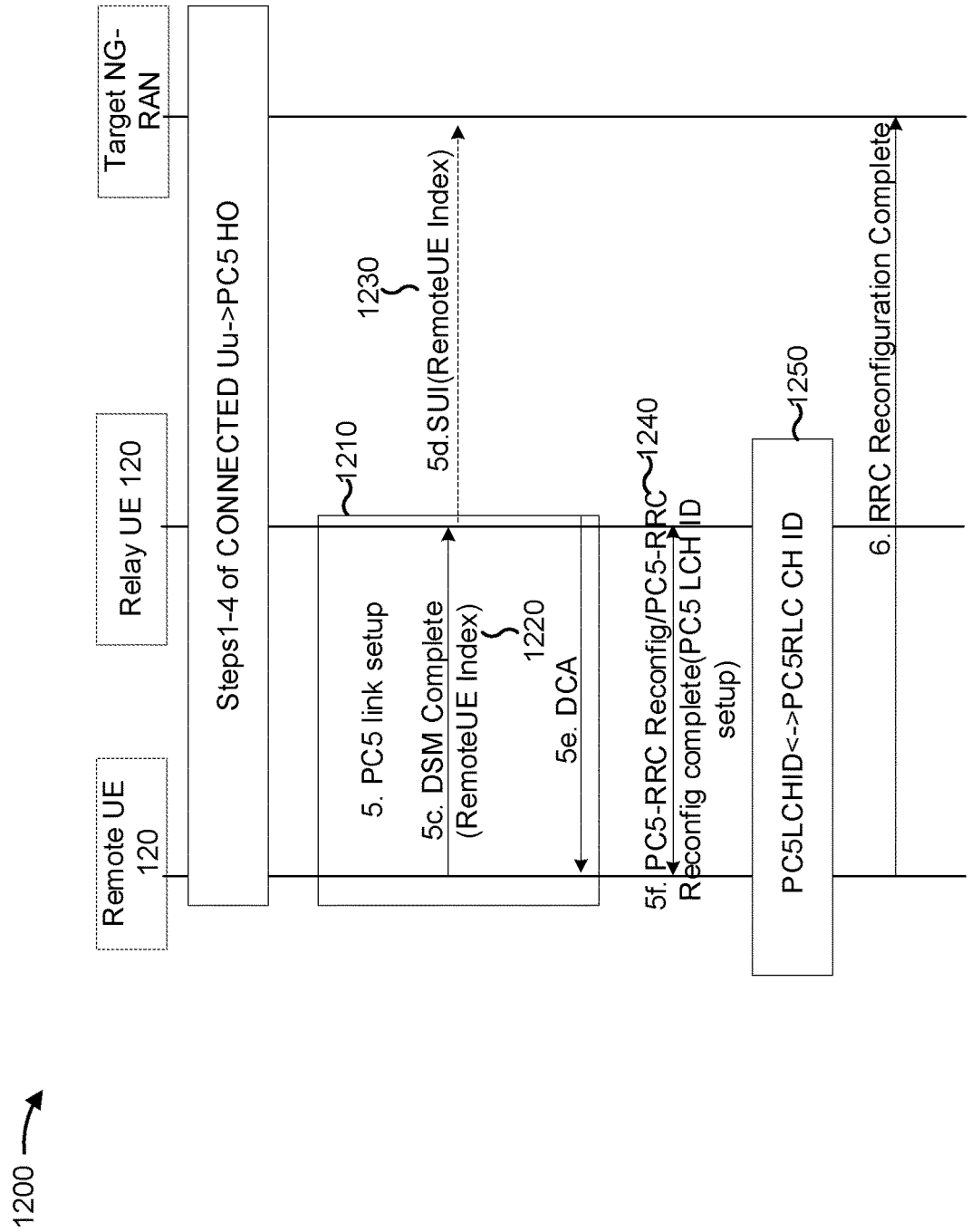

FIGS. 11 and 12 show examples 1100, 1200 of configuration of SRBs and/or DRBs for a remote UE in a connected mode, in accordance with the present disclosure. Example 1100 shows a handover-triggered SRB/DRB configuration, whereas example 1200 shows execution of the handover. As shown in FIG. 11, a remote UE may establish a radio access connection with a source NG-RAN. As further shown, the remote UE 120 may provide, to the source NG-RAN, information associated with the relay UE 120. As shown by reference number 1110, the source NG-RAN and a target NG-RAN may perform handover preparation for handover of the remote UE 120 from the radio access connection to a sidelink connection (e.g., via a sidelink unicast link with the relay UE 120). Accordingly, as shown by reference number 1120, the target NG-RAN may perform RRC reconfiguration with the relay UE 120. For example, the target NG-RAN may provide configuration information for one or more relaying radio access RLC bearers including radio access RLC channel identifiers, sidelink RLC bearers including sidelink RLC channel identifiers corresponding to Remote UE radio access bearers, the RAP layer, and/or the like. As shown by reference number 1130, the source NG-RAN may provide, to the remote UE 120, configuration information indicating a relay UE identifier, a remote UE index of the remote UE 120, a configuration for a radio access bearer, and a configuration for a sidelink RLC bearer (e.g., including sidelink RLC channel identifier) for the purpose of the handover to the sidelink connection.

As shown by reference number 1210 of FIG. 12, the remote UE 120 and the relay UE 120 may perform PC5 unicast link setup, as described elsewhere herein. As shown by reference number 1220, the remote UE 120 may provide, to the relay UE 120, a remote UE index associated with the remote UE 120 (e.g., in a direct security mode complete (DSM complete) message and/or the like). As shown by reference number 1230, the relay UE 120 may provide the remote UE index to the target NG-RAN. As shown by reference number 1240, the relay UE 120 and the remote UE 120 may exchange sidelink RLC channel identifiers via PC5-RRC messages to use the same configuration provided by the B S 110 for the associated sidelink logical channel. As shown by reference number 1250, the relay UE 120 and the remote UE 120 may map the sidelink RLC channel identifiers to respective sidelink logical channels (e.g., based at least in part on sidelink logical channel identifiers). In some aspects, the relay UE 120 may assign a remote UE index different than the NG-RAN assigned value to the remote UE 120, and may transmit information indicating the remote UE index in addition to the NG-RAN assigned remote UE index to the target NG-RAN.

Returning to FIG. 5, as shown by reference number 540, the remote UE 120 and the relay UE 120 may perform identifier updates for privacy. For example, the relay UE 120 may update a Remote UE index and the radio access RLC channel identifier associated with the relaying connection. If the sidelink unicast link is configured as shown by option 610 or option 620 of FIG. 6, the NG-RAN may request the relay UE 120 to update a radio access RLC channel identifier associated with the remote UE 120. If the sidelink unicast link is configured as shown by option 630 of FIG. 6, the NG-RAN may request the relay UE 120 to update a remote UE index associated with the remote UE 120 sidelink unicast link. In the first and second cases described above (associated with options 610 and 620), the relay UE 102 may release and reestablish the corresponding radio access RLC bearer.

Figure 13:
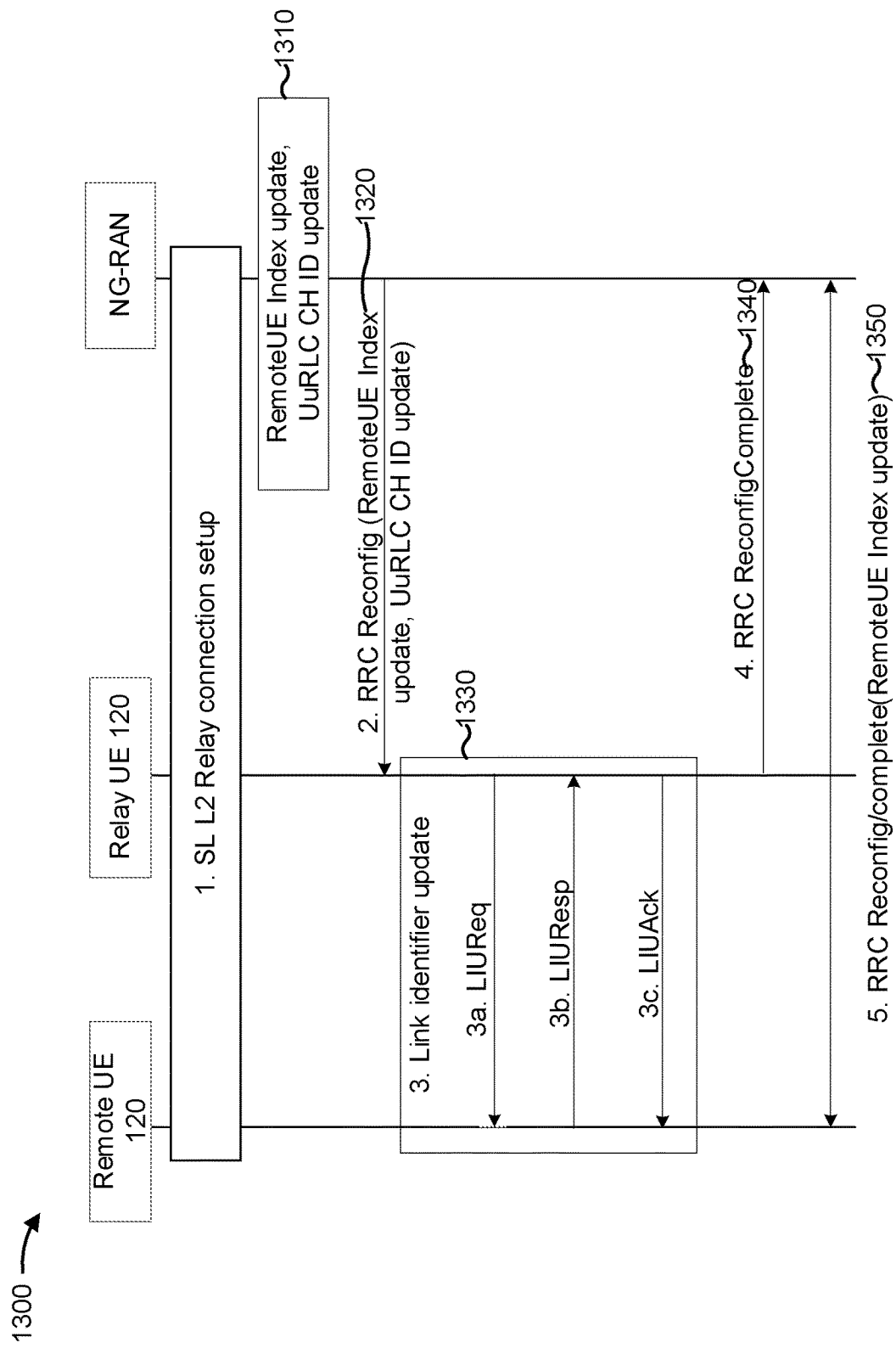
FIG. 13 is a diagram illustrating an example of a base station triggered RAP layer mapping identifier update, in accordance with the present disclosure.

In some aspects, the BS 110 may trigger a RAP layer mapping identifier update, for example, to support the updates for privacy described above. For example, FIG. 13 is a diagram illustrating an example 1300 of a base station triggered RAP layer mapping identifier update, in accordance with the present disclosure. The BS 110 may maintain a timer that indicates to perform a relaying identifier update. The timer may start when a remote UE index is configured. Expiry of the timer may trigger the operations shown in FIG. 13. In some aspects, the operations shown in FIG. 13 may be triggered by another condition, such as an amount of traffic transmitted on the radio access RLC bearer for a specific remote UE 120 via the relay UE 120. As shown by reference number 1310, the BS 110 may update the remote UE index and the corresponding radio access RLC channel identifier based at least in part on if the sidelink unicast link is configured as shown by option 610, 620, or 630. As shown by reference number 1320, the BS 110 may transmit the updated index and identifier to the relay UE 120. The relay UE 120 may initiate a link identifier update (LIU), shown by reference number 1330, based at least in part on receiving the updated index and identifier from the BS 110. As shown by reference number 1340, the relay UE 120 may provide information indicating a successful unicast link update to the BS 110 upon completing the link identifier update. As shown by reference number 1350, in some aspects, the BS 110 may provide, to the remote UE 120 via the relay UE 120, information indicating the updated remote UE index. In some aspects, the remote UE index may be included by the remote UE 120 in communications relating to connection resumption from an inactive state or during RRC reestablishment procedures. In some cases, the NG-RAN may request an update based at least in part on a periodic timer maintained for privacy support. In some other cases, the NG-RAN may request this update due to an indication from the relay UE 120 that the source Layer 2 or destination Layer 2 identifier corresponding to the sidelink unicast link between the remote UE 120 and the relay UE 120 is to be updated.

Figure 14:
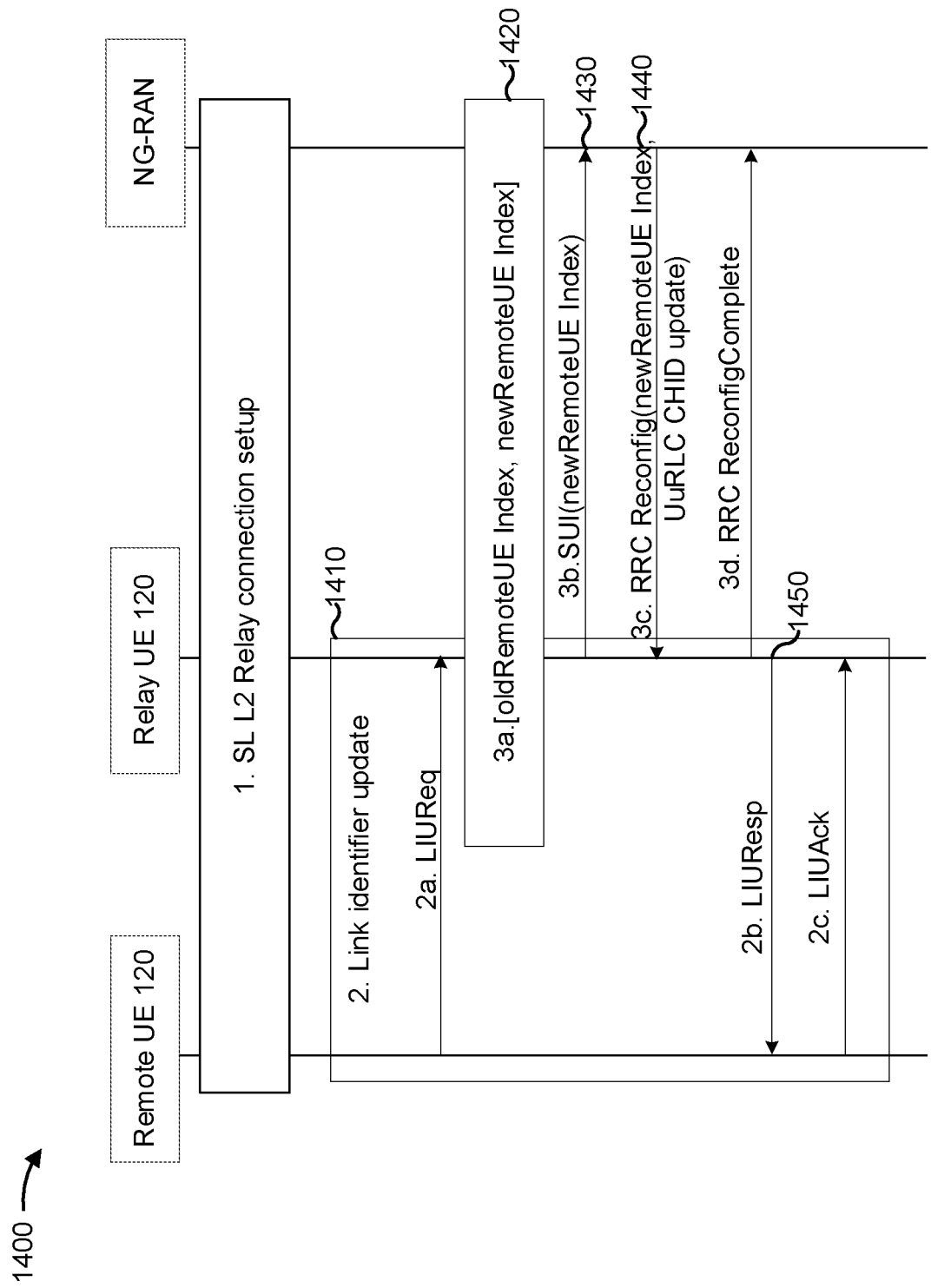
FIG. 14 is a diagram illustrating an example of a remote UE triggered RAP layer mapping identifier update, in accordance with the present disclosure.

FIG. 14 is a diagram illustrating an example 1400 of a remote UE triggered RAP layer mapping identifier update in accordance with the present disclosure. For example, the remote UE 120 may maintain a timer associated with a link identifier update for the sidelink unicast link. If the timer is set to a non-infinite value, then the remote UE 120 may trigger the RAP layer mapping identifier update due to a Link identifier update procedure trigger when the timer expires, as shown by reference number 1410. As shown by reference number 1420, the relay UE 120 may determine an updated remote UE index for the remote UE 120 based at least in part on receiving a Link Identifier Update Request (LIU Req) message from the remote UE 120. As shown by reference number 1430, the relay UE 120 may initiate an index update procedure, and may provide the updated remote UE index to the BS 110. As shown by reference number 1440, the BS 110 may provide an RRC reconfiguration message indicating the updated remote UE index, may assign a different value for the remote UE index based at least in part on the received remote UE index, and may provide an updated radio access RLC channel identifier. The relay UE 120 may transmit a link identifier update response, shown by reference number 1450, after the RRC reconfiguration with the BS 110 is successful. In some aspects, the BS 110 may determine to update the radio access RLC channel identifier, and may perform the actions shown by reference numbers 1430 to 1450. In some aspects, the operations shown in FIG. 14 may be triggered by another condition, such as an amount of traffic transmitted on the sidelink unicast link or a collision of an L2 identifier on the remote UE 120. In some aspects, the relay UE 120 may trigger the operation shown by reference number 1420 and perform the actions shown by reference numbers 1430 to 1450 due to a timer associated with a link identifier update for the sidelink unicast link maintained by the relay UE 120, the amount of traffic sent on the sidelink unicast link, or a collision of an L2 identifier at the relay UE 120. In such cases, where the operation shown by reference number 1420 is triggered by the relay UE 120, the relay UE 120 may perform the RAP layer identifier update procedure including the Link Identifier update procedure with remote UE 120 as shown in FIG. 13 by reference numbers 1330 and 1340, after receiving the RRC reconfiguration message shown by reference number 1440. The relay UE 120 may transmit one RRC reconfiguration complete message to the NG-RAN based at least in part on receiving the message shown by reference number 1440 to indicate the successful reception of the message, and may transmit another RRC reconfiguration complete message after successful update of the identifiers shown by reference number 1340.

Figure 15:
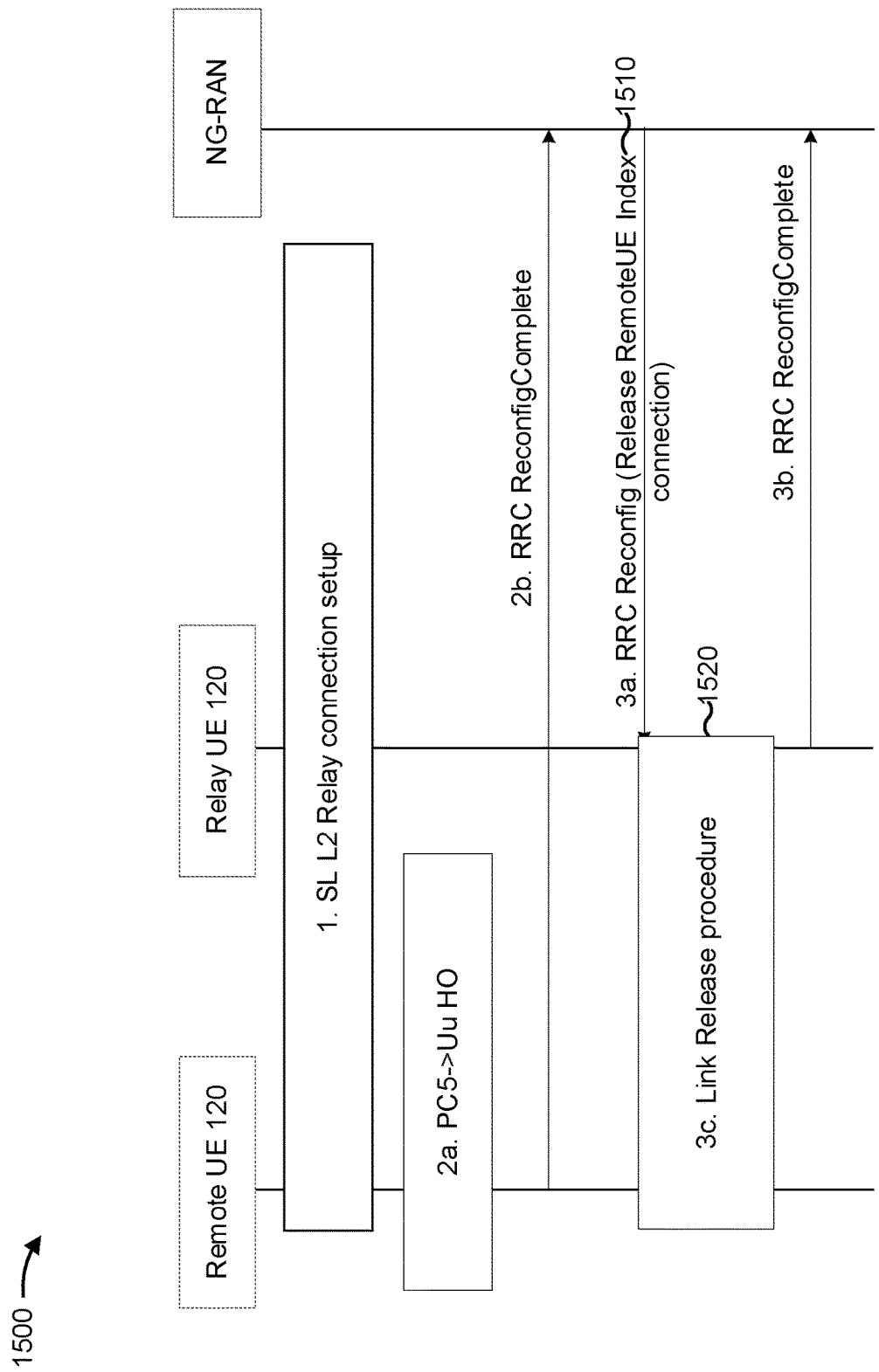
FIGS. 15 and 16 show examples of signaling associated with configuration release for a sidelink unicast link associated with a Layer 2 relay service, in accordance with the present disclosure.
Figure 16:
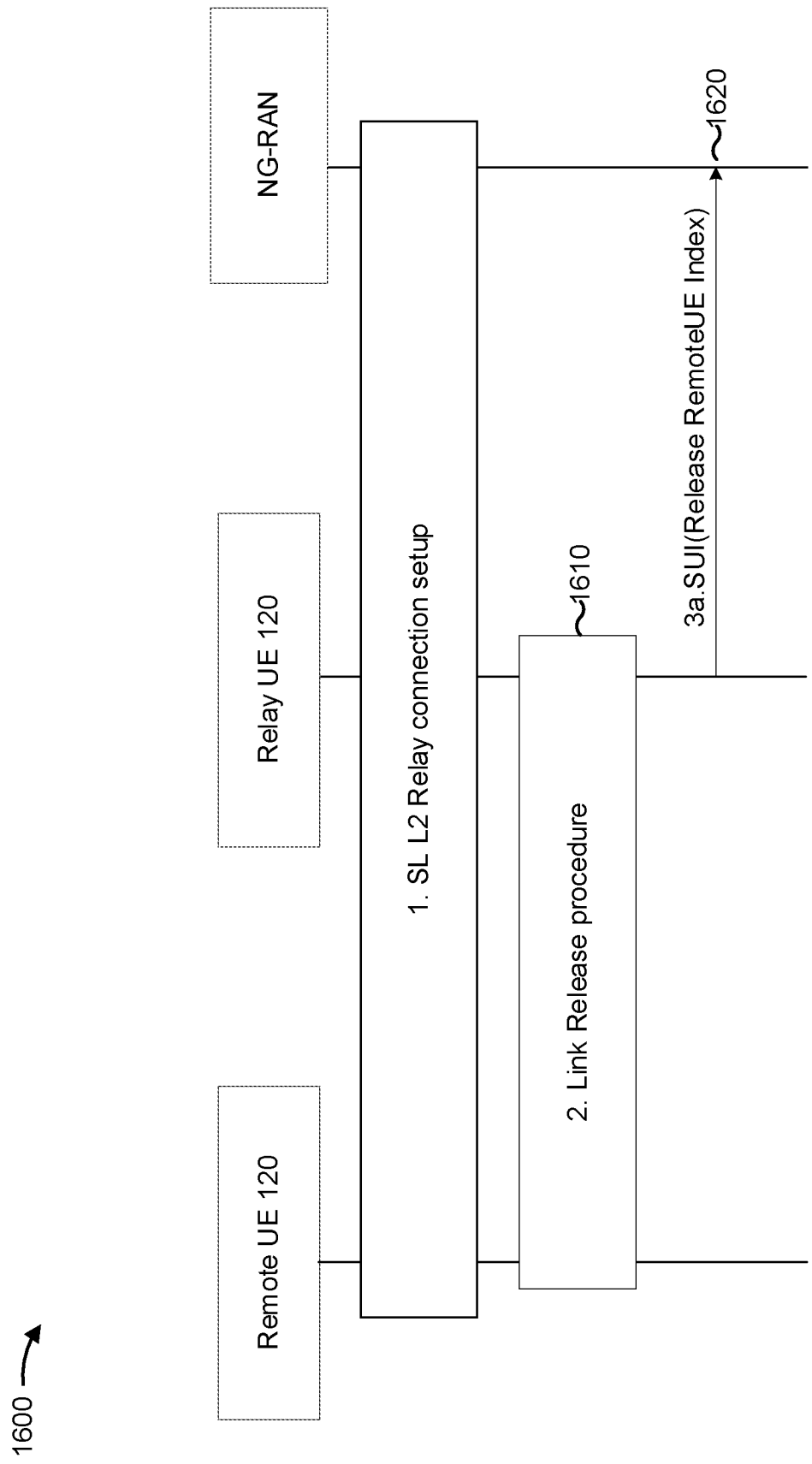

Returning to FIG. 5, as shown by reference number 550, the remote UE 120 and the relay UE 120 may release the sidelink unicast link. For example, the remote UE 120 and the relay UE 120 may release the sidelink unicast link and/or a configuration for the RAP layer associated with the sidelink unicast link. FIGS. 15 and 16 show examples 1500 and 1600 of signaling associated with configuration release for a sidelink unicast link associated with a Layer 2 relay service, in accordance with the present disclosure. In example 1500 of FIG. 15, the configuration release is triggered by the BS 110 using the message shown by reference number 1510. For example, the BS 10 may initiate release of the remote UE 120's unicast link upon success of a sidelink to radio access mobility operation, based at least in part on a loading condition at the relay UE 120, based at least in part on a QoS determination, and/or the like. As shown by reference number 1520, the relay UE 120 may release the remote UE 120's relaying connection or sidelink unicast link, and may release relaying support for the remote UE 120 over the radio access link. In example 1600 of FIG. 16, the configuration release is triggered by the relay UE 120, as shown by reference number 1610. Upon release of the sidelink unicast link, the relay UE 120 may transmit an indication to the B S 110 indicating to release the relay connection and/or the remote UE index associated with the sidelink unicast link, as shown by reference number 1620.

As indicated above, FIGS. 5-16 are provided as examples. Other examples may differ from what is described with respect to FIGS. 5-16.

Figure 17:
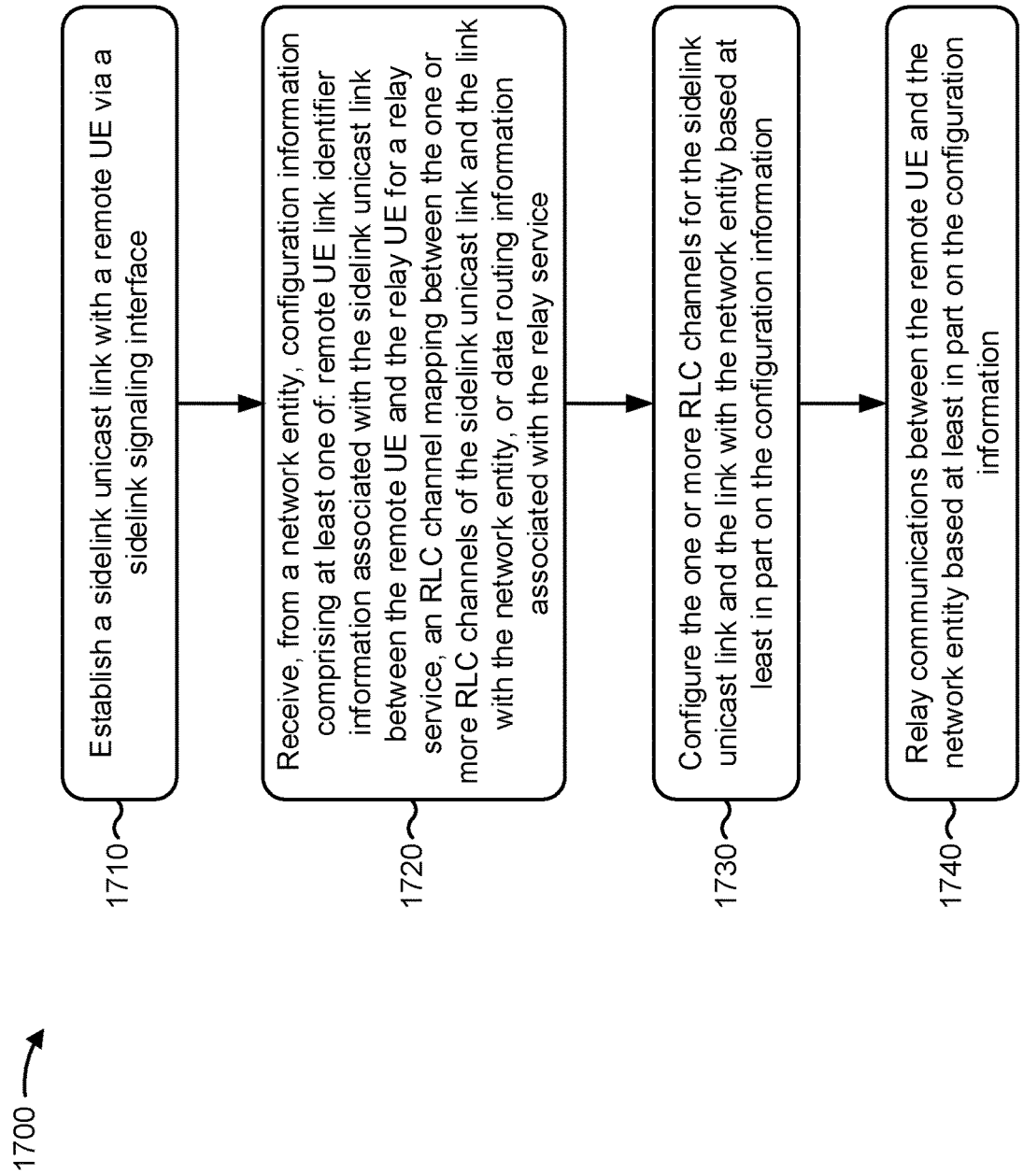
FIG. 17 is a diagram illustrating an example process performed, for example, by a relay user equipment, in accordance with the present disclosure.

FIG. 17 is a diagram illustrating an example process 1700 performed, for example, by a relay UE, in accordance with the present disclosure. Example process 1700 is an example where the relay UE (e.g., UE 120 and/or the like) performs operations associated with relay adaptation protocol layer configuration.

As shown in FIG. 17, in some aspects, process 1700 may include establishing a sidelink unicast link with a remote UE via a sidelink signaling interface (block 1710). For example, the relay UE (e.g., using controller/processor 280, transmit processor 264, TX MIMO processor 266, MOD 254, antenna 252, and/or the like) may establish a sidelink unicast link with a remote UE via a sidelink signaling interface, as described above.

As further shown in FIG. 17, in some aspects, process 1700 may include receiving, from a network entity, configuration information comprising at least one of: remote UE link identifier information associated with the sidelink unicast link between the remote UE and the relay UE for a relay service, an RLC channel mapping between the one or more RLC channels of the sidelink unicast link and the link with the network entity, or data routing information associated with the relay service (block 1720). For example, the relay UE (e.g., using antenna 252, DEMOD 254, MIMO detector 256, receive processor 258, controller/processor 280, and/or the like) may receive, from a network entity, configuration information comprising at least one of remote UE link identifier information associated with the sidelink unicast link between the remote UE and the relay UE for a relay service, an RLC channel mapping between the one or more RLC channels of the sidelink unicast link and the link with the network entity, or data routing information associated with the relay service, as described above.

As further shown in FIG. 17, in some aspects, process 1700 may include configuring the one or more RLC channels for the sidelink unicast link and the link with the network entity based at least in part on the configuration information (block 1730). For example, the relay UE (e.g., using controller/processor 280, transmit processor 264, TX MIMO processor 266, MOD 254, antenna 252, and/or the like) may configure the one or more RLC channels for the sidelink unicast link and the link with the network entity based at least in part on the configuration information, as described above.

As further shown in FIG. 17, in some aspects, process 1700 may include relaying communications between the remote UE and the network entity based at least in part on the configuration information (block 1740). For example, the relay UE (e.g., using antenna 252, DEMOD 254, MIMO detector 256, receive processor 258, controller/processor 280, and/or the like) may relay communications between the remote UE and the network entity based at least in part on the configuration information, as described above.

Process 1700 may include additional aspects, such as any single aspect or any combination of aspects described below and/or in connection with one or more other processes described elsewhere herein.

In a first aspect, at least part of the configuration information is used by a relay adaptation protocol (RAP) layer of the relay UE to relay the communications.

In a second aspect, alone or in combination with the first aspect, the configuration information indicates a mapping of one or more sidelink RLC channels to one or more radio access RLC channels that uses one of: a one-to-one basis, or an N-to-one basis, where N is variable.

In a third aspect, alone or in combination with one or more of the first and second aspects, the remote UE link identifier information corresponds to a remote UE index, the sidelink unicast link is uniquely associated with an assigned remote UE link identifier based at least in part on a source Layer 2 identifier and a target Layer 2 identifier associated with the sidelink unicast link.

In a fourth aspect, alone or in combination with one or more of the first through third aspects, process 1700 includes assigning a unique index associated with the sidelink unicast link; and transmitting information indicating the unique index to the network entity via a radio resource control message.

In a fifth aspect, alone or in combination with one or more of the first through fourth aspects, the relay service is identified by a relay service code, and establishment of the sidelink unicast link is based at least in part on a security setting corresponding to the relay service code.

In a sixth aspect, alone or in combination with one or more of the first through fifth aspects, a set of one or more dedicated radio bearers or signaling radio bearers use a same security setting based at least in part on the sidelink unicast link associated with the relay service.

In a seventh aspect, alone or in combination with one or more of the first through sixth aspects, the sidelink unicast link supports one or more of: multiple sidelink RLC channels for one or more radio access bearers of the remote UE, multiple radio access protocol data unit sessions on a single link, or multiple sidelink RLC channels with a same quality of service configuration.

In an eighth aspect, alone or in combination with one or more of the first through seventh aspects, the remote UE is one of a plurality of remote UEs associated with respective relay services via the relay UE.

In a ninth aspect, alone or in combination with one or more of the first through eighth aspects, the remote UE link identifier information corresponds to a unique index assigned to each UE, of a plurality of remote UEs connected to the relay UE via respective sidelink unicast links.

In a tenth aspect, alone or in combination with one or more of the first through ninth aspects, the relaying the communications is via multiple radio access RLC channels associated with multiple remote UEs.

In an eleventh aspect, alone or in combination with one or more of the first through tenth aspects, a radio access RLC channel is mapped to multiple sidelink RLC channels that are associated with a same quality of service.

In a twelfth aspect, alone or in combination with one or more of the first through eleventh aspects, a radio access RLC channel is mapped to multiple sidelink RLC channels that are associated with different qualities of service.

In a thirteenth aspect, alone or in combination with one or more of the first through twelfth aspects, the configuration information indicates one or more mappings of a set of radio access RLC channels to a set of sidelink RLC channels and a set of remote UEs.

In a fourteenth aspect, alone or in combination with one or more of the first through thirteenth aspects, relaying the communications is based at least in part on a relay adaptation protocol (RAP) header, the RAP header indicates one or more of an identifier of the remote UE based at least in part on a unique identifier of the sidelink unicast link, a sidelink RLC channel associated with a radio access bearer associated with the remote UE, or a path identifier for the data routing associated with the relay service.

In a fifteenth aspect, alone or in combination with one or more of the first through fourteenth aspects, process 1700 includes performing sidelink control plane signaling on a sidelink signaling radio bearer on the sidelink unicast link.

In a sixteenth aspect, alone or in combination with one or more of the first through fifteenth aspects, process 1700 includes performing radio access signaling via a radio access signaling radio bearer on the sidelink unicast link.

In a seventeenth aspect, alone or in combination with one or more of the first through sixteenth aspects, relaying the communications is based at least in part on a radio access data radio bearer or protocol data unit session configured to satisfy a quality of service associated with the relay service.

In an eighteenth aspect, alone or in combination with one or more of the first through seventeenth aspects, the configuration information indicates one or more respective sidelink RLC channels corresponding to one or more radio access signaling radio bearers or one or more radio access data radio bearers.

In a nineteenth aspect, alone or in combination with one or more of the first through eighteenth aspects, the configuration information indicates a plurality of radio access signaling radio bearers that are multiplexed onto a single sidelink RLC channel based at least in part on one or more indexes of the plurality of radio access signaling radio bearers.

In a twentieth aspect, alone or in combination with one or more of the first through nineteenth aspects, the configuration information indicates a radio access RLC channel that is configured for multiplexing multiple radio access signaling radio bearers associated with the remote UE.

In a twenty-first aspect, alone or in combination with one or more of the first through twentieth aspects, the configuration information is received via radio resource control signaling.

In a twenty-second aspect, alone or in combination with one or more of the first through twenty-first aspects, the RLC channel mapping relates to one or more data radio bearers, and the RLC channel mapping is received based at least in part on a request from the relay UE or a handover of the remote UE to the sidelink unicast link.

In a twenty-third aspect, alone or in combination with one or more of the first through twenty-second aspects, the relaying is performed by a relay adaptation protocol (RAP) layer of the relay UE that is based at least in part on a backhaul adaptation protocol (BAP) associated with an integrated access backhaul technology.

In a twenty-fourth aspect, alone or in combination with one or more of the first through twenty-third aspects, the remote UE is associated with a radio access inactive state, a radio access idle state, or an out-of-coverage state, and configuration of the one or more RLC channels in association with one or more remote UE signaling radio bearers is triggered based at least in part on an indication by the relay UE regarding setup of the sidelink unicast link with the remote UE for relaying.

In a twenty-fifth aspect, alone or in combination with one or more of the first through twenty-fourth aspects, the remote UE is associated with a radio access inactive state, a radio access idle state, or an out-of-coverage state, and configuration of the one or more RLC channels in association with one or more remote UE data radio bearers is triggered based at least in part on successful configuration of a connection with the remote UE.

In a twenty-sixth aspect, alone or in combination with one or more of the first through twenty-fifth aspects, process 1700 includes exchanging, with the remote UE, one or more sidelink RLC channel identifiers in connection with configuring the sidelink unicast link for the relay service.

In a twenty-seventh aspect, alone or in combination with one or more of the first through twenty-sixth aspects, process 1700 includes maintaining a mapping between the one or more sidelink RLC channel identifiers and one or more sidelink logical channel identifiers assigned to one or more logical channels associated with the one or more sidelink RLC channels.

In a twenty-eighth aspect, alone or in combination with one or more of the first through twenty-seventh aspects, the remote UE is in a radio access connected mode, and receiving the configuration information is triggered based at least in part on a handover of the remote UE from a radio access connection to a relaying connection via the sidelink unicast link, and the configuration information includes a bearer configuration associated with one or more remote UE data radio bearers or signaling radio bearers.

In a twenty-ninth aspect, alone or in combination with one or more of the first through twenty-eighth aspects, process 1700 includes receiving, from the remote UE, information indicating a sidelink unicast link index; associating the sidelink unicast link index with the sidelink unicast link between the remote UE and relay UE; and transmitting the index to the network entity via a radio resource control message.

In a thirtieth aspect, alone or in combination with one or more of the first through twenty-ninth aspects, process 1700 includes assigning an index associated with the sidelink unicast link; and transmitting the index to the network entity via a radio resource control message.

In a thirty-first aspect, alone or in combination with one or more of the first through thirtieth aspects, process 1700 includes configuring a privacy setting for the relay service; determining to update at least one of a source Layer 2 (L2) identifier or a destination L2 identifier of the sidelink unicast link; performing a sidelink unicast link identifier update procedure with the remote UE; updating one or more radio access RLC channel identifiers and an assigned remote UE index based at least in part on a successful result of the sidelink unicast link identifier update procedure; and transmitting a response message to the network entity indicating a successful result of the sidelink unicast link identifier update procedure.

In a thirty-second aspect, alone or in combination with one or more of the first through thirty-first aspects, determining to update at least one of the source L2 identifier or the destination L2 identifier of the sidelink unicast link is based at least in part on at least one of: receiving an indication from the network entity to update at least one of: the source L2 identifier, the destination L2 identifier, one or more radio access RLC channel identifiers, or an assigned remote UE index, a configuration maintained for the sidelink unicast link, or receiving a link identifier update request from the remote UE.

In a thirty-third aspect, alone or in combination with one or more of the first through thirty-second aspects, process 1700 includes transmitting a notification to the network entity before initiating the sidelink unicast link identifier update procedure.

In a thirty-fourth aspect, alone or in combination with one or more of the first through thirty-third aspects, the updating of the source L2 identifier or the destination L2 identifier of the sidelink unicast link is triggered by the relay UE based at least in part on a timer.

In a thirty-fifth aspect, alone or in combination with one or more of the first through thirty-fourth aspects, process 1700 includes releasing the sidelink unicast link based at least in part on a release indication from the network entity, wherein the release indication is being based at least in part on at least one of: a handover of the remote UE to a radio access connection, a load is associating with the relay UE, or a quality of service requirement.

In a thirty-sixth aspect, alone or in combination with one or more of the first through thirty-fifth aspects, process 1700 includes releasing the sidelink unicast link; and transmitting, to the network entity, an indication that the sidelink unicast link has been released.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
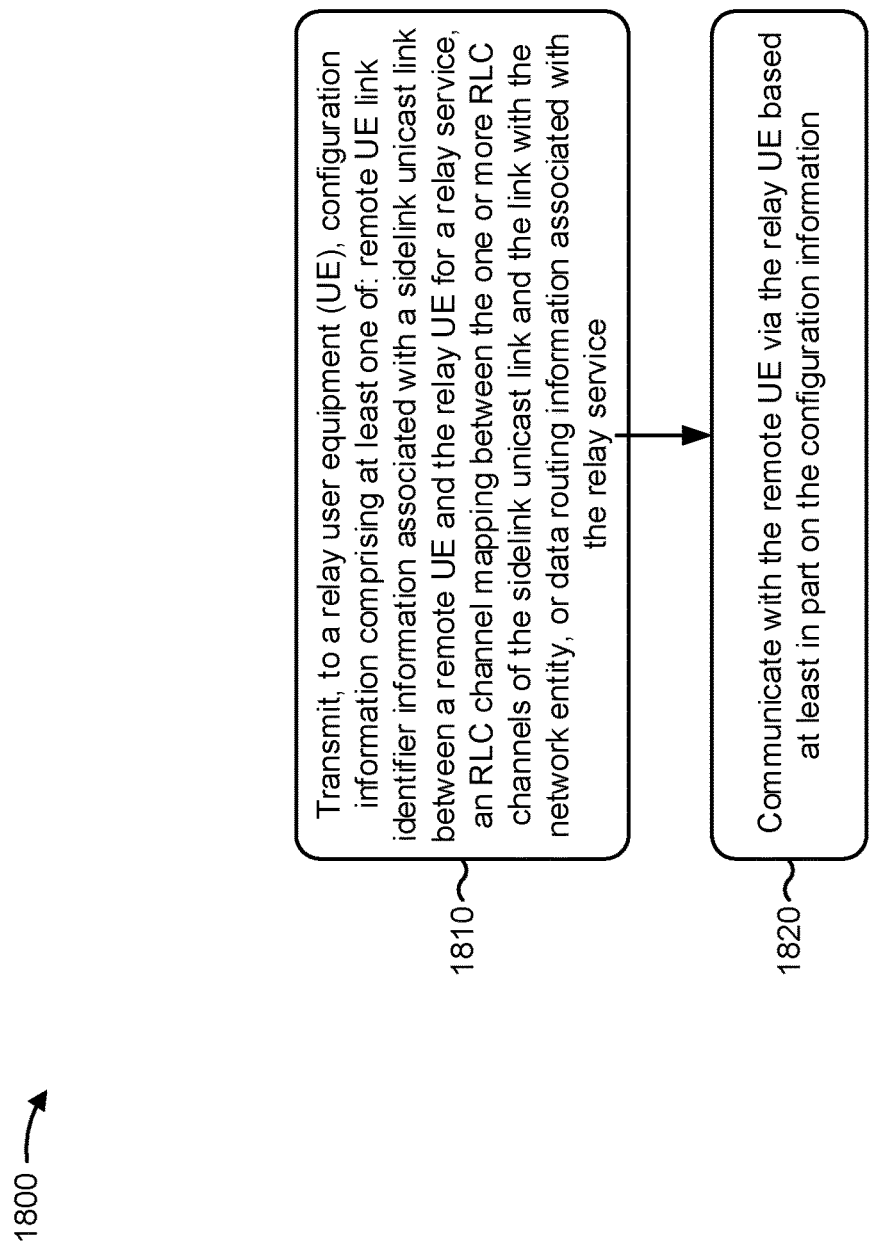
FIG. 18 is a diagram illustrating an example process performed, for example, by a network entity, in accordance with the present disclosure.

FIG. 18 is a diagram illustrating an example process 1800 performed, for example, by a network entity, in accordance with the present disclosure. Example process 1800 is an example where the network entity (e.g., BS 110, an NG-RAN, a gNB, and/or the like) performs operations associated with relay adaptation protocol layer configuration.

As shown in FIG. 18, in some aspects, process 1800 may include transmitting, to a relay user equipment (UE), configuration information comprising at least one of: remote UE link identifier information associated with a sidelink unicast link between a remote UE and the relay UE for a relay service, an RLC channel mapping between the one or more RLC channels of the sidelink unicast link and the link with the network entity, or data routing information associated with the relay service (block 1810). For example, the network entity (e.g., using controller/processor 240, transmit processor 220, TX MIMO processor 230, MOD 232, antenna 234, and/or the like) may transmit, to a relay user equipment (UE), configuration information comprising at least one of remote UE link identifier information associated with a sidelink unicast link between a remote UE and the relay UE for a relay service, an RLC channel mapping between the one or more RLC channels of the sidelink unicast link and the link with the network entity, or data routing information associated with the relay service, as described above.

As further shown in FIG. 18, in some aspects, process 1800 may include communicating with the remote UE via the relay UE based at least in part on the configuration information (block 1820). For example, the network entity (e.g., using controller/processor 240, transmit processor 220, TX MIMO processor 230, MOD 232, antenna 234, and/or the like) may communicate with the remote UE via the relay UE based at least in part on the configuration information, as described above.

Process 1800 may include additional aspects, such as any single aspect or any combination of aspects described below and/or in connection with one or more other processes described elsewhere herein.

In a first aspect, the configuration information is for a relay adaptation protocol (RAP) layer of the relay UE.

In a second aspect, alone or in combination with the first aspect, the configuration information indicates a mapping of one or more sidelink RLC channels to one or more radio access RLC channels that uses one of: a one-to-one basis, or an N-to-one basis, where N is variable.

In a third aspect, alone or in combination with one or more of the first and second aspects, process 1800 includes receiving information indicating a unique index associated with the sidelink unicast link via a radio resource control message, wherein the communicating is based at least in part on the information indicating the unique index.

In a fourth aspect, alone or in combination with one or more of the first through third aspects, process 1800 includes configuring a radio access data radio bearer or protocol data unit session to satisfy a quality of service associated with the relay service.

In a fifth aspect, alone or in combination with one or more of the first through fourth aspects, the configuration information indicates one or more respective sidelink RLC channels corresponding to one or more radio access signaling radio bearers or one or more radio access data radio bearers.

In a sixth aspect, alone or in combination with one or more of the first through fifth aspects, the configuration information indicates a plurality of radio access signaling radio bearers that are multiplexed onto a single sidelink RLC channel based at least in part on one or more indexes of the plurality of radio access signaling radio bearers.

In a seventh aspect, alone or in combination with one or more of the first through sixth aspects, the configuration information indicates a radio access RLC channel that is configured for multiplexing multiple radio access signaling radio bearers associated with the remote UE.

In an eighth aspect, alone or in combination with one or more of the first through seventh aspects, the configuration information is transmitted via radio resource control signaling.

In a ninth aspect, alone or in combination with one or more of the first through eighth aspects, the RLC channel mapping relates to one or more data radio bearers, and the RLC channel mapping is transmitted based at least in part on receiving a request from the relay UE or a handover of the remote UE to the sidelink unicast link.

In a tenth aspect, alone or in combination with one or more of the first through ninth aspects, the communication is performed by a relay adaptation protocol (RAP) layer of the network entity that is based at least in part on a backhaul adaptation protocol (BAP) associated with an integrated access backhaul technology.

In an eleventh aspect, alone or in combination with one or more of the first through tenth aspects, the remote UE is associated with a radio access inactive state, a radio access idle state, or an out-of-coverage state, and transmitting the configuration information further comprises: transmitting the configuration information based at least in part on receiving an indication by the relay UE regarding setup of the sidelink unicast link with the remote UE for relaying, wherein the configuration information configures the one or more RLC channels in association with one or more remote UE signaling radio bearers.

In a twelfth aspect, alone or in combination with one or more of the first through eleventh aspects, the method further comprises: transmitting, to the remote UE via the relay UE, information indicating a sidelink RLC channel identifier for the remote UE.

In a thirteenth aspect, alone or in combination with one or more of the first through twelfth aspects, the remote UE is associated with a radio access inactive state, a radio access idle state, or an out-of-coverage state, and transmitting the configuration information further comprises: transmitting the configuration information based at least in part on successful configuration of a connection with the remote UE, the configuration information configures the one or more RLC channels in association with one or more remote UE data radio bearers.

In a fourteenth aspect, alone or in combination with one or more of the first through thirteenth aspects, process 1800 includes transmitting, to the remote UE, information indicating a remote UE index, the one or more remote UE data radio bearers, and one or more sidelink RLC channel identifiers associated with the one or more RLC channels.

In a fifteenth aspect, alone or in combination with one or more of the first through fourteenth aspects, process 1800 includes receiving information indicating one or more sidelink RLC channel identifiers associated with configuring the sidelink unicast link for the relay service.

In a sixteenth aspect, alone or in combination with one or more of the first through fifteenth aspects, the remote UE is in a radio access connected mode, and transmitting the configuration information further comprises: transmitting the configuration information based at least in part on a handover of the remote UE from a radio access connection to a relaying connection via the sidelink unicast link, the configuration information includes a bearer configuration associated with one or more remote UE data radio bearers or signaling radio bearers.

In a seventeenth aspect, alone or in combination with one or more of the first through sixteenth aspects, process 1800 includes transmitting, to the remote UE in a handover command, information indicating a remote UE index associated with the remote UE.

In an eighteenth aspect, alone or in combination with one or more of the first through seventeenth aspects, process 1800 includes receiving, from the relay UE, a sidelink unicast link index determined by the relay UE via a radio resource control message.

In a nineteenth aspect, alone or in combination with one or more of the first through eighteenth aspects, process 1800 includes determining to update at least one of a source Layer 2 (L2) identifier or a destination L2 identifier of the sidelink unicast link; triggering a sidelink unicast link identifier update procedure of the relay UE and the remote UE based at least in part on determining to update at least one of the source L2 identifier or the destination L2 identifier; and receiving a response message from the relay UE indicating a successful result of the link identifier update procedure.

In a twentieth aspect, alone or in combination with one or more of the first through nineteenth aspects, triggering the sidelink unicast link identifier update procedure is based at least in part on an indication to update at least one of: the source L2 identifier, the destination L2 identifier, one or more radio access RLC channel identifiers, or an assigned remote UE index.

In a twenty-first aspect, alone or in combination with one or more of the first through twentieth aspects, triggering the update is based at least in part on a timer associated with the sidelink unicast link identifier.

In a twenty-second aspect, alone or in combination with one or more of the first through twenty-first aspects, the timer is one of a plurality of timers associated with respective sidelink unicast link identifiers.

In a twenty-third aspect, alone or in combination with one or more of the first through twenty-second aspects, the timer is associated with a plurality of sidelink unicast link identifiers, and the sidelink unicast link identifier update procedure is triggered for the plurality of sidelink unicast link identifiers upon expiry of the timer.

In a twenty-fourth aspect, alone or in combination with one or more of the first through twenty-third aspects, the timer is initiated upon setup of the sidelink unicast link identifier.

In a twenty-fifth aspect, alone or in combination with one or more of the first through twenty-fourth aspects, process 1800 includes transmitting, to the remote UE, information indicating an assigned remote UE index.

In a twenty-sixth aspect, alone or in combination with one or more of the first through twenty-fifth aspects, process 1800 includes receiving a notification from the relay UE indicating that a sidelink unicast link identifier update procedure is to be performed to update at least one of a source Layer 2 (L2) identifier or a destination L2 identifier, wherein the updating of the source L2 identifier or the destination L2 identifier of the sidelink unicast link is being triggered by the relay UE based at least in part on a timer.

In a twenty-seventh aspect, alone or in combination with one or more of the first through twenty-sixth aspects, process 1800 includes transmitting, to the relay UE, information indicating at least one of an updated radio access RLC channel identifier or an assigned remote UE index associated with the sidelink unicast link.

In a twenty-eighth aspect, alone or in combination with one or more of the first through twenty-seventh aspects, process 1800 includes transmitting a release indication that indicates to release the sidelink unicast link, wherein the release indication is being based at least in part on at least one of: a handover of the remote UE to a radio access connection, a load is associating with the relay UE, or a quality of service requirement.

In a twenty-ninth aspect, alone or in combination with one or more of the first through twenty-eighth aspects, process 1800 includes receiving a relay adaptation protocol (RAP) protocol data unit (PDU); determining a signaling radio bearer or data radio bearer associated with the remote UE based at least in part on a RAP header of the received RAP PDU; removing the RAP header; and transferring a New Radio packet data convergence protocol (PDCP) PDU of the RAP PDU to an upper layer.

In a thirtieth aspect, alone or in combination with one or more of the first through twenty-ninth aspects, process 1800 includes determining a remote UE index associated with the sidelink unicast link for the remote UE; determining a sidelink RLC channel of the remote UE corresponding to a radio access bearer of the remote UE, determining a radio access RLC channel corresponding to the sidelink RLC channel of the remote UE; generating a relay adaptation protocol (RAP) header including at least one of the remote UE Index, a sidelink RLC channel identifier of the sidelink RLC channel of the remote UE, or a path identifier; and transmitting a RAP layer protocol data unit (PDU) with the RAP header on the radio access RLC channel.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
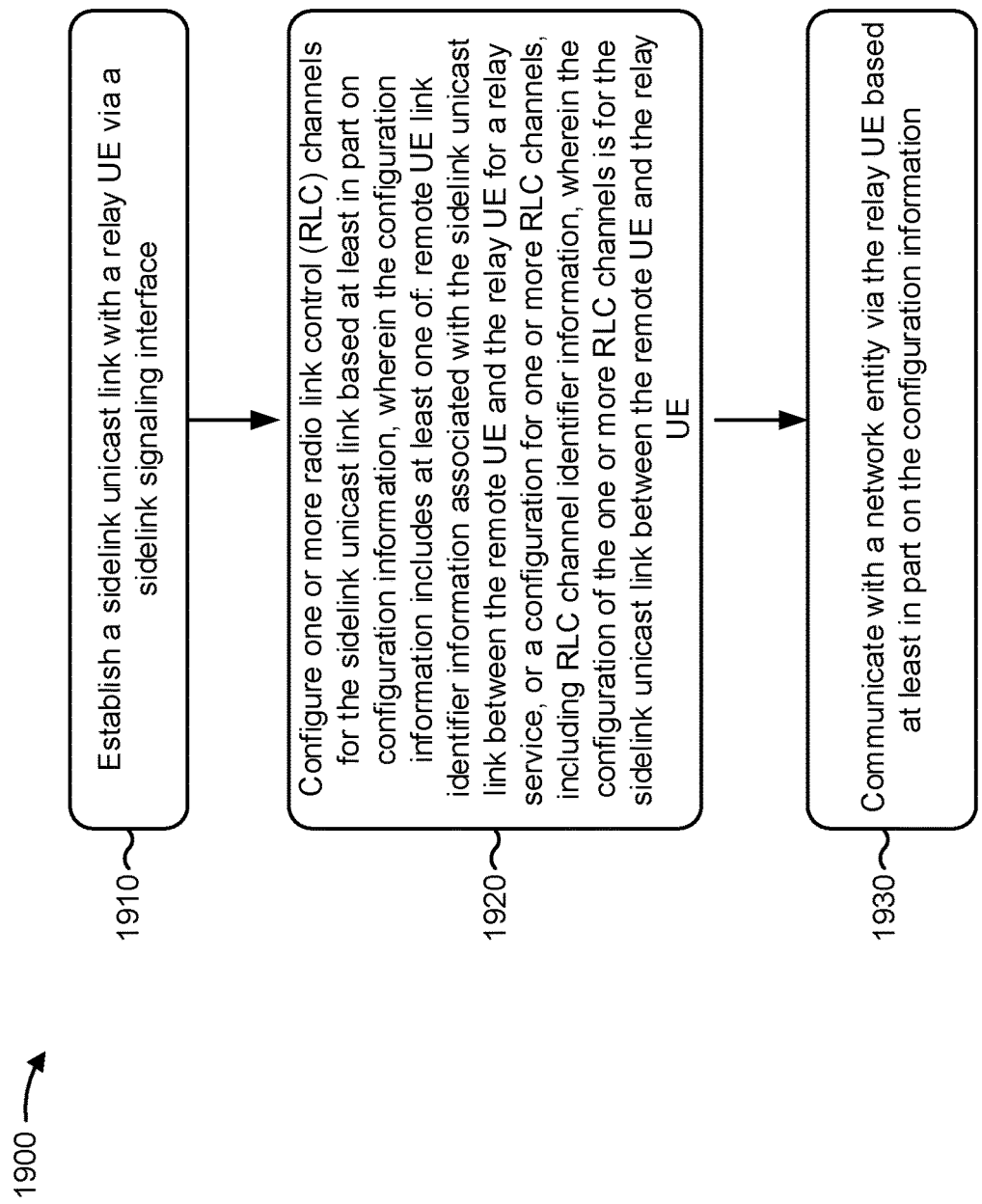
FIG. 19 is a diagram illustrating an example process performed, for example, by a remote user equipment, in accordance with the present disclosure.

FIG. 19 is a diagram illustrating an example process 1900 performed, for example, by a remote UE, in accordance with the present disclosure. Example process 1900 is an example where the remote UE (e.g., UE 120 and/or the like) performs operations associated with relay adaptation protocol layer configuration.

As shown in FIG. 19, in some aspects, process 1900 may include establishing a sidelink unicast link with a relay UE via a sidelink signaling interface (block 1910). For example, the remote UE (e.g., using controller/processor 280, transmit processor 264, TX MIMO processor 266, MOD 254, antenna 252, and/or the like) may establish a sidelink unicast link with a relay UE via a sidelink signaling interface, as described above.

As further shown in FIG. 19, in some aspects, process 1900 may include configuring one or more radio link control (RLC) channels for the sidelink unicast link based at least in part on configuration information, wherein the configuration information includes at least one of: remote UE link identifier information associated with the sidelink unicast link between the remote UE and the relay UE for a relay service, or a configuration for one or more RLC channels, including RLC channel identifier information, wherein the configuration of the one or more RLC channels is for the sidelink unicast link between the remote UE and the relay UE (block 1920). For example, the remote UE (e.g., using antenna 252, DEMOD 254, MIMO detector 256, receive processor 258, controller/processor 280, and/or the like) may configure one or more radio link control (RLC) channels for the sidelink unicast link based at least in part on configuration information, as described above. In some aspects, the configuration information includes at least one of remote UE link identifier information associated with the sidelink unicast link between the remote UE and the relay UE for a relay service, or a configuration for one or more RLC channels, including RLC channel identifier information, wherein the configuration of the one or more RLC channels is for the sidelink unicast link between the remote UE and the relay UE.

As further shown in FIG. 19, in some aspects, process 1900 may include communicating with a network entity via the relay UE based at least in part on the configuration information (block 1930). For example, the remote UE (e.g., using controller/processor 280, transmit processor 264, TX MIMO processor 266, MOD 254, antenna 252, and/or the like) may communicate with a network entity via the relay UE based at least in part on the configuration information, as described above.

Process 1900 may include additional aspects, such as any single aspect or any combination of aspects described below and/or in connection with one or more other processes described elsewhere herein.

In a first aspect, the relay service is identified by a relay service code, and establishment of the sidelink unicast link is based at least in part on a security setting corresponding to the relay service code.

In a second aspect, alone or in combination with the first aspect, process 1900 includes receiving a configuration for a set of one or more remote UE dedicated radio bearers or remote UE sidelink signaling radio bearers that use the security setting based at least in part on the relay service code.

In a third aspect, alone or in combination with one or more of the first and second aspects, the remote UE link identifier information corresponds to a unique index assigned to the remote UE.

In a fourth aspect, alone or in combination with one or more of the first through third aspects, process 1900 includes performing sidelink control plane signaling on a sidelink signaling radio bearer on the sidelink unicast link.

In a fifth aspect, alone or in combination with one or more of the first through fourth aspects, process 1900 includes performing radio access signaling via a radio access signaling radio bearer on the sidelink unicast link.

In a sixth aspect, alone or in combination with one or more of the first through fifth aspects, an RLC channel is associated with multiple radio access signaling radio bearers, and a relay adaption protocol layer of the remote UE indicates an index of a selected radio access signaling radio bearer for a communication via the RLC channel.

In a seventh aspect, alone or in combination with one or more of the first through sixth aspects, the remote UE is associated with a radio access inactive state, a radio access idle state, or an out-of-coverage state, and the method further comprises: receiving, in connection with configuring a radio access signaling radio bearer, information indicating a remote UE index of the remote UE and a sidelink RLC channel configuration including a sidelink RLC channel identifier.

In an eighth aspect, alone or in combination with one or more of the first through seventh aspects, the remote UE is associated with a radio access inactive state, a radio access idle state, or an out-of-coverage state, and the method further comprises: receiving, in connection with configuring a radio access data radio bearer, information indicating a remote UE index of the remote UE, a configuration of the radio access data radio bearer, and a sidelink RLC channel configuration including a sidelink RLC channel identifier.

In a ninth aspect, alone or in combination with one or more of the first through eighth aspects, process 1900 includes exchanging, with the relay UE, one or more sidelink RLC channel identifiers in connection with configuring the sidelink unicast link for the relay service.

In a tenth aspect, alone or in combination with one or more of the first through ninth aspects, the remote UE is in a radio access connected mode, and receiving the configuration information is triggered based at least in part on a handover of the remote UE from a radio access connection to a relaying connection via the sidelink unicast link, and the configuration information includes a bearer configuration associated with one or more remote UE data radio bearers or signaling radio bearers.

In an eleventh aspect, alone or in combination with one or more of the first through tenth aspects, process 1900 includes transmitting, to the relay UE, information indicating a sidelink unicast link index for the sidelink unicast link.

In a twelfth aspect, alone or in combination with one or more of the first through eleventh aspects, process 1900 includes receiving, in connection with a sidelink unicast link identifier update procedure, information indicating an updated remote UE index of the remote UE.

In a thirteenth aspect, alone or in combination with one or more of the first through twelfth aspects, process 1900 includes transmitting, to the relay UE, a link identifier update request based at least in part on a timer; and performing a sidelink unicast link identifier update procedure with the relay UE based at least in part on the link identifier update request.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
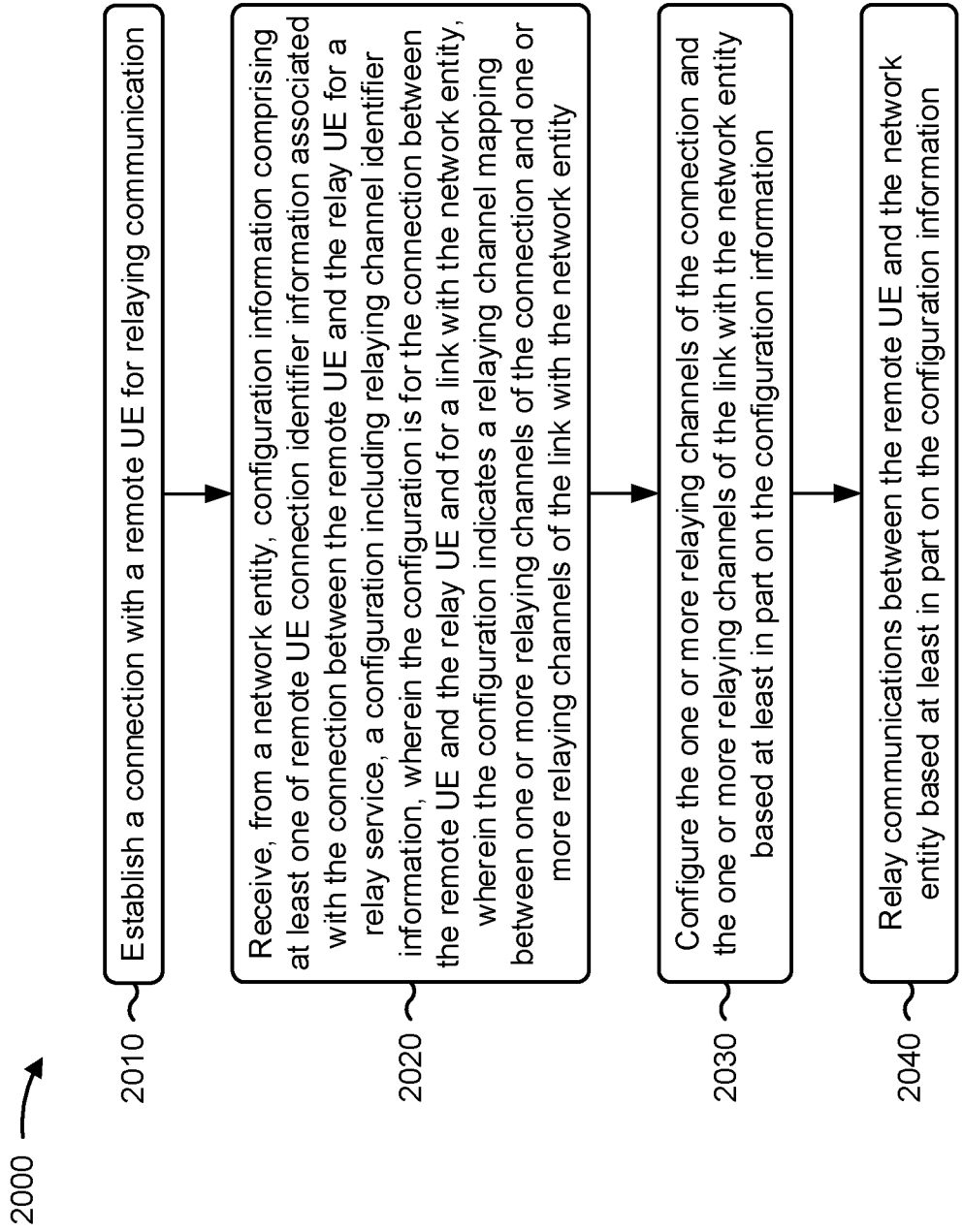
FIG. 20 is a diagram illustrating an example process performed, for example, by a relay user equipment, in accordance with the present disclosure.

FIG. 20 is a diagram illustrating an example process 2000 performed, for example, by a relay UE, in accordance with the present disclosure. Example process 2000 is an example where the relay UE (e.g., UE 120, relay UE 120, relay UE 310, relay UE 410,) performs operations associated with RAP layer configuration.

As shown in FIG. 20, in some aspects, process 2000 may include establishing a connection with a remote UE for relaying communication (block 2010). For example, the relay UE (e.g., using controller/processor 280, transmit processor 264, TX MIMO processor 266, MOD 254, antenna 252, and/or the like) may establish a connection with a remote UE for relaying communication, as described above. Establishment of the connection is illustrated, for example, by reference number 510 of FIG. 5, as well as in FIGS. 8, 9, 12, 15, and 16 (e.g., as "PC5 unicast link setup" or "SL L2 Relay connection setup). The connection may be a PC5 connection (e.g., a sidelink unicast link setup using a sidelink signaling interface), a Bluetooth connection, a WiFi connection, a device to device connection, or the like.

As further shown in FIG. 20, in some aspects, process 2000 may include receiving, from a network entity, configuration information comprising at least one of: remote UE connection identifier information associated with the connection between the remote UE and the relay UE for a relay service, or a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity (block 2020). For example, the relay UE (e.g., using antenna 252, DEMOD 254, MIMO detector 256, receive processor 258, controller/processor 280, and/or the like) may receive, from a network entity, configuration information (e.g., configuration information 520) comprising at least one of: remote UE connection identifier information associated with the connection between the remote UE and the relay UE for a relay service, or a configuration including relaying channel identifier information. The configuration may be for the connection between the remote UE and the relay UE and for a link with the network entity (such as a radio access link, which may be a Uu link, between the relay UE and the network entity). The configuration indicates a relaying channel mapping between one or more relaying channels of the connection and one or more relaying channels of the link with the network entity, as described above. The relaying channel mapping is shown, for example, in FIG. 6 at reference number 610, 620, and 630. A relaying channel may include, for example, an RLC channel. The remote UE connection identifier information is described, for example, in connection with reference number 520 of FIG. 5. A remote UE connection identifier may include an a remote UE index configuration, a unique identifier, a remote UE index associated with the remote UE, or the like.

As further shown in FIG. 20, in some aspects, process 2000 may include configuring the one or more relaying channels of the connection and the one or more relaying channels of the link with the network entity based at least in part on the configuration information (block 2030). For example, the relay UE (e.g., using controller/processor 280, transmit processor 264, TX MIMO processor 266, MOD 254, antenna 252, and/or the like) may configure the one or more relaying channels of the connection and the one or more relaying channels of the link with the network entity based at least in part on the configuration information, as described above. The configuration of the one or more relaying channels is illustrated, for example, in FIG. 5 at reference numbers 530 and 540.

As further shown in FIG. 20, in some aspects, process 2000 may include relaying communications between the remote UE and the network entity based at least in part on the configuration information (block 2040). For example, the relay UE (e.g., using controller/processor 280, transmit processor 264, TX MIMO processor 266, MOD 254, antenna 252, and/or the like) may relay communications between the remote UE and the network entity based at least in part on the configuration information, as described above. The relaying of communications is shown, for example, by reference number 530 of FIG. 5.

Process 2000 may include additional aspects, such as any single aspect or any combination of aspects described below and/or in connection with one or more other processes described elsewhere herein.

In a first aspect, the connection is via a sidelink signaling interface.

In a second aspect, alone or in combination with the first aspect, at least part of the configuration information is used by a relay adaptation protocol (RAP) layer (such as RAP layer 345 of FIG. 3) of the relay UE to relay the communications.

In a third aspect, alone or in combination with one or more of the first and second aspects, the relaying channel mapping uses one of a one-to-one basis, or an N-to-one basis, where N is variable. Examples of such bases are shown in FIG. 6.

In a fourth aspect, alone or in combination with one or more of the first through third aspects, the connection is at least one of a sidelink unicast link setup using a sidelink signaling interface, a Bluetooth connection, a WiFi connection, or a device to device connection.

In a fifth aspect, alone or in combination with one or more of the first through fourth aspects, the remote UE connection identifier information corresponds to a remote UE index, wherein the connection is uniquely associated with an assigned remote UE connection identifier identified by the remote UE connection identifier information. A remote UE index is unique index identifying the remote UE 120's connection with the relay UE 120, such as illustrated by reference number 710 of FIG. 7.

In a sixth aspect, alone or in combination with one or more of the first through fourth aspects, for a sidelink unicast link, the remote UE connection identifier is based at least in part on a source Layer 2 identifier and a target Layer 2 identifier associated with the sidelink unicast link.

In a seventh aspect, alone or in combination with one or more of the first through sixth aspects, process 2000 includes assigning a unique index associated with the connection, wherein the unique index is an assigned remote UE connection identifier (such as shown by reference number 710 of FIG. 7) identified by the remote UE connection identifier information, and transmitting information indicating the unique index to the network entity via a radio resource control message. The assignment of the unique index and transmission of the radio resource control message is described, for example, in connection with reference number 910 of FIG. 9. Examples of the radio resource control message are also shown by reference numbers 1230 of FIG. 12 and 1430 of FIG. 14.

In an eighth aspect, alone or in combination with one or more of the first through seventh aspects, a set of one or more sidelink dedicated radio bearers or signaling radio bearers use a same security setting based at least in part on the connection associated with the relay service. This is described in more detail in connection with reference number 510 of FIG. 5.

In a ninth aspect, alone or in combination with one or more of the first through eighth aspects, the connection supports one or more of multiple relaying channels for one or more radio access bearers of the remote UE, multiple radio access protocol data unit (PDU) sessions on a single link, or multiple relaying channels with a same or different quality of service (QoS) configuration. Multiple relaying channels for a radio access bearer (that is, a bearer associated with the connection between the relay UE and the network entity) are described in connection with reference number 510 of FIG. 5. Multiple radio access PDU sessions on a single link are described in connection with reference number 510 of FIG. 5. Multiple relaying channels with the same QoS configuration are described in connection with reference number 510 of FIG. 5. Multiple relaying channels with different QoS configurations are described in connection with reference number 520 of FIG. 5.

In a tenth aspect, alone or in combination with one or more of the first through ninth aspects, the communications are relayed via multiple radio access relaying channels associated with multiple remote UEs. For example, the multiple radio access relaying channels are illustrated by reference number 620 of FIG. 6.

In an eleventh aspect, alone or in combination with one or more of the first through tenth aspects, a radio access relaying channel is mapped to multiple relaying channels for the connection. An example of this mapping is provided in connection with reference number 610 of FIG. 6.

In a twelfth aspect, alone or in combination with one or more of the first through eleventh aspects, relaying the communications is based at least in part on a relay adaptation protocol (RAP) header (such as the RAP header of example 700 shown in FIG. 7), wherein the RAP header indicates one or more of an identifier of the remote UE based at least in part on a unique identifier of the connection (that is, a remote UE index as illustrated by reference number 710 of FIG. 7), the one or more relaying channels for the connection associated with a radio access bearer associated with the remote UE (for example, a PC5 RLC channel identifier as illustrated by reference number 720 of FIG. 7), or a path identifier for data routing associated with the relay service (such as the path identifier shown by reference number 730 of FIG. 7). The identifier of the remote UE (that is, a remote UE connection identifier) may be based at least in part on the unique identifier of the connection. For example, the identifier of the remote UE may be the same as the unique identifier, may be a part of the unique identifier, may be a hash of the unique identifier, or the like.

In a thirteenth aspect, alone or in combination with one or more of the first through twelfth aspects, relaying the communications is based at least in part on a radio access data radio bearer (DRB) of a protocol data unit (PDU) session configured to satisfy a quality of service (QoS) associated with the relay service. An example is provided in connection with FIG. 5 at reference number 530.

In a fourteenth aspect, alone or in combination with one or more of the first through thirteenth aspects, the one or more relaying channels of the connection correspond to one or more radio access signaling radio bearers (SRBs) or one or more radio access data radio bearers (DRBs). An example is described in connection with reference number 520 of FIG. 5.

In a fifteenth aspect, alone or in combination with one or more of the first through fourteenth aspects, the configuration information indicates a plurality of radio access signaling radio bearers (SRBs) that are multiplexed onto a single connection relaying channel based at least in part on one or more indexes of the plurality of radio access SRBs. This is described, for example, in connection with reference number 530 of FIG. 5.

In a sixteenth aspect, alone or in combination with one or more of the first through fifteenth aspects, the configuration information indicates a radio access relaying channel that is configured for multiplexing multiple radio access signaling radio bearers (SRBs) associated with the remote UE. This is described, for example, in connection with reference number 530 of FIG. 5.

In a seventeenth aspect, alone or in combination with one or more of the first through sixteenth aspects, the relaying is performed by a relay adaptation protocol (RAP) layer of the relay UE that is based at least in part on a backhaul adaptation protocol (BAP) associated with an integrated access backhaul technology. The RAP layer based at least in part on BAP is described in connection with reference number 530 of FIG. 5.

In an eighteenth aspect, alone or in combination with one or more of the first through seventeenth aspects, process 2000 includes exchanging, with the remote UE, one or more relaying channel identifiers for the connection while configuring the connection for the relay service. Examples are shown by reference number 1040 of FIG. 10 and reference number 1240 of FIG. 12.

In a nineteenth aspect, alone or in combination with one or more of the first through eighteenth aspects, process 2000 includes maintaining a mapping between the one or more relaying channel identifiers for the connection and one or more logical channel identifiers assigned to one or more logical channels associated with the one or more relaying channels for the connection. The mapping is illustrated, for example, by reference number 1050 of FIG. 10 and by the table 740 of FIG. 7.

In a twentieth aspect, alone or in combination with one or more of the first through nineteenth aspects, the remote UE is in a radio access connected mode (shown in FIG. 11), and wherein receiving the configuration information is triggered based at least in part on a handover of the remote UE from a radio access connection to a relaying connection via the relay UE (shown by reference number 1240 of FIG. 12), and wherein the configuration information includes a bearer configuration associated with one or more radio access data radio bearers or signaling radio bearer (shown by reference number 1120 of FIG. 11).

In a twenty-first aspect, alone or in combination with one or more of the first through twentieth aspects, process 2000 includes receiving, from the remote UE, information indicating a remote UE connection identifier, associating the remote UE connection identifier to the connection between the remote UE and the relay UE, and transmitting the remote UE connection identifier to the network entity via a radio resource control message. Examples are shown by reference number 1220 of FIG. 12, reference number 1330 of FIG. 13, and reference number 1420 of FIG. 14.

In a twenty-second aspect, alone or in combination with one or more of the first through twenty-first aspects, process 2000 includes configuring a privacy setting for the relay service, determining to update identifiers of the connection, performing a connection identifier update with the remote UE, updating one or more radio access relaying channel identifiers and an assigned remote UE index based at least in part on a successful result of the connection identifier update, and transmitting a response message to the network entity indicating a successful result of the connection identifier update. An example of a privacy update is provided in connection with reference number 540 of FIG. 5.

In a twenty-third aspect, alone or in combination with one or more of the first through twenty-second aspects, process 2000 includes releasing the connection, and transmitting, to the network entity, an indication that the connection has been released. An example is provided in connection with FIG. 16.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
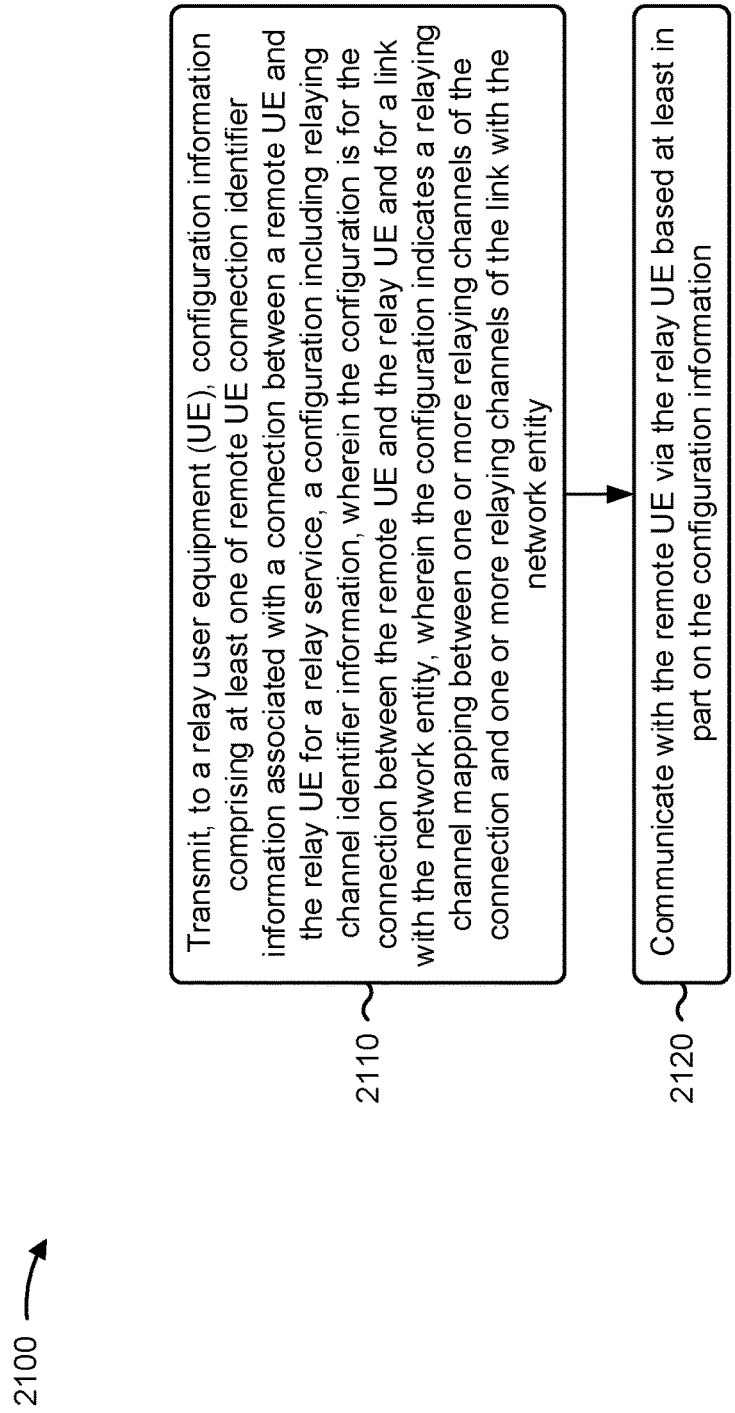
FIG. 21 is a diagram illustrating an example process performed, for example, by a network entity, in accordance with the present disclosure.

FIG. 21 is a diagram illustrating an example process 2100 performed, for example, by a network entity, in accordance with the present disclosure. Example process 2100 is an example where the network entity (e.g., BS 110, NG-RAN 340, a source NG-RAN, a target NG-RAN, a CU, or the like) performs operations associated with RAP layer configuration.

As shown in FIG. 21, in some aspects, process 2100 may include transmitting, to a relay UE, configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity (block 2110). For example, the network entity (e.g., using controller/processor 240, transmit processor 220, TX MIMO processor 230, MOD 232, antenna 234, and/or the like) may transmit, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity, as described above.

As further shown in FIG. 21, in some aspects, process 2100 may include communicating with the remote UE via the relay UE based at least in part on the configuration information (block 2120). For example, the network entity (e.g., using controller/processor 240, transmit processor 220, TX MIMO processor 230, MOD 232, antenna 234, and/or the like) may communicate with the remote UE via the relay UE based at least in part on the configuration information, as described above.

Process 2100 may include additional aspects, such as any single aspect or any combination of aspects described below and/or in connection with one or more other processes described elsewhere herein.

In a first aspect, the configuration information is for a relay adaptation protocol (RAP) layer of the relay UE.

In a second aspect, alone or in combination with the first aspect, process 2100 includes configuring a radio access data radio bearer or protocol data unit session to satisfy a quality of service associated with the relay service.

In a third aspect, alone or in combination with one or more of the first and second aspects, the configuration information indicates the one or more relaying channels of the connection correspond to one or more radio access signaling radio bearers or one or more radio access data radio bearers.

In a fourth aspect, alone or in combination with one or more of the first through third aspects, the remote UE is associated with a radio access inactive state, a radio access idle state, or an out-of-coverage state, and wherein transmitting the configuration information further comprises transmitting the configuration information based at least in part on receiving an indication by the relay UE regarding setup of the connection with the remote UE for relaying, wherein the configuration information configures the one or more relaying channels of the connection in association with one or more remote UE signaling radio bearers.

In a fifth aspect, alone or in combination with one or more of the first through fourth aspects, the method further comprises transmitting, to the remote UE via the relay UE, information indicating a relaying channel identifier, for the one or more relaying channels of the connection, for the remote UE.

In a sixth aspect, alone or in combination with one or more of the first through fifth aspects, the remote UE is associated with a radio access inactive state, a radio access idle state, or an out-of-coverage state, and wherein transmitting the configuration information further comprises transmitting the configuration information based at least in part on successful configuration of the connection with the remote UE, wherein the configuration information configures the one or more relaying channels of the connection in association with one or more remote UE data radio bearers.

In a seventh aspect, alone or in combination with one or more of the first through sixth aspects, process 2100 includes transmitting, to the remote UE, information indicating a remote UE index, the one or more remote UE data radio bearers, and one or more relaying channel identifiers associated with the one or more relaying channels of the connection.

In an eighth aspect, alone or in combination with one or more of the first through seventh aspects, process 2100 includes receiving information indicating one or more relaying channel identifiers associated with configuring the connection.

In a ninth aspect, alone or in combination with one or more of the first through eighth aspects, the remote UE is in a radio access connected mode, and wherein transmitting the configuration information further comprises transmitting the configuration information based at least in part on a handover of the remote UE from a radio access connection to a relaying connection via the connection, wherein the configuration information includes a bearer configuration associated with one or more remote UE data radio bearers or signaling radio bearers.

In a tenth aspect, alone or in combination with one or more of the first through ninth aspects, process 2100 includes transmitting, to the remote UE in a handover command, information indicating a remote UE index associated with the remote UE.

In an eleventh aspect, alone or in combination with one or more of the first through tenth aspects, process 2100 includes receiving, from the relay UE, a connection index determined by the relay UE via a radio resource control message.

In a twelfth aspect, alone or in combination with one or more of the first through eleventh aspects, process 2100 includes determining to update at least one of a source Layer 2 (L2) identifier or a destination L2 identifier of the connection, wherein the connection is a sidelink unicast link, triggering a connection identifier update of the relay UE and the remote UE based at least in part on determining to update at least one of the source L2 identifier or the destination L2 identifier, and receiving a response message from the relay UE indicating a successful result of the connection identifier update.

In a thirteenth aspect, alone or in combination with one or more of the first through twelfth aspects, triggering the connection identifier update is based at least in part on an indication to update at least one of the source L2 identifier, the destination L2 identifier, one or more radio access relaying channel identifiers, or an assigned remote UE index.

In a fourteenth aspect, alone or in combination with one or more of the first through thirteenth aspects, triggering the connection identifier update is based at least in part on a timer associated with the connection identifier.

In a fifteenth aspect, alone or in combination with one or more of the first through fourteenth aspects, process 2100 includes transmitting, to the remote UE, information indicating an assigned remote UE index.

In a sixteenth aspect, alone or in combination with one or more of the first through fifteenth aspects, process 2100 includes receiving a notification from the relay UE indicating that a connection identifier update procedure is to be performed to update at least one of a source Layer 2 (L2) identifier or a destination L2 identifier of the connection, wherein the updating of the source L2 identifier or the destination L2 identifier of the connection is triggered by the relay UE based at least in part on a timer.

In a seventeenth aspect, alone or in combination with one or more of the first through sixteenth aspects, process 2100 includes transmitting, to the relay UE, information indicating at least one of an updated radio access relaying channel identifier or an assigned remote UE index associated with the connection.

In an eighteenth aspect, alone or in combination with one or more of the first through seventeenth aspects, process 2100 includes transmitting a release indication that indicates to release the connection, wherein the release indication is based at least in part on at least one of a handover of the remote UE to a radio access connection, a load associated with the relay UE, or a quality of service requirement.

In a nineteenth aspect, alone or in combination with one or more of the first through eighteenth aspects, process 2100 includes receiving a relay adaptation protocol (RAP) protocol data unit (PDU), determining a signaling radio bearer or data radio bearer associated with the remote UE based at least in part on a RAP header of the received RAP PDU, removing the RAP header, and transferring a New Radio packet data convergence protocol (PDCP) PDU of the RAP PDU to an upper layer.

In a twentieth aspect, alone or in combination with one or more of the first through nineteenth aspects, process 2100 includes determining a remote UE index associated with the connection for the remote UE, determining a relaying channel for the connection of the remote UE corresponding to a radio access bearer of the remote UE, determining a radio access relaying channel corresponding to the relaying channel for the connection of the remote UE, generating a relay adaptation protocol (RAP) header including at least one of the remote UE Index, a relaying channel identifier of the relaying channel for the connection of the remote UE, or a path identifier, and transmitting a RAP layer protocol data unit (PDU) with the RAP header on the radio access relaying channel.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
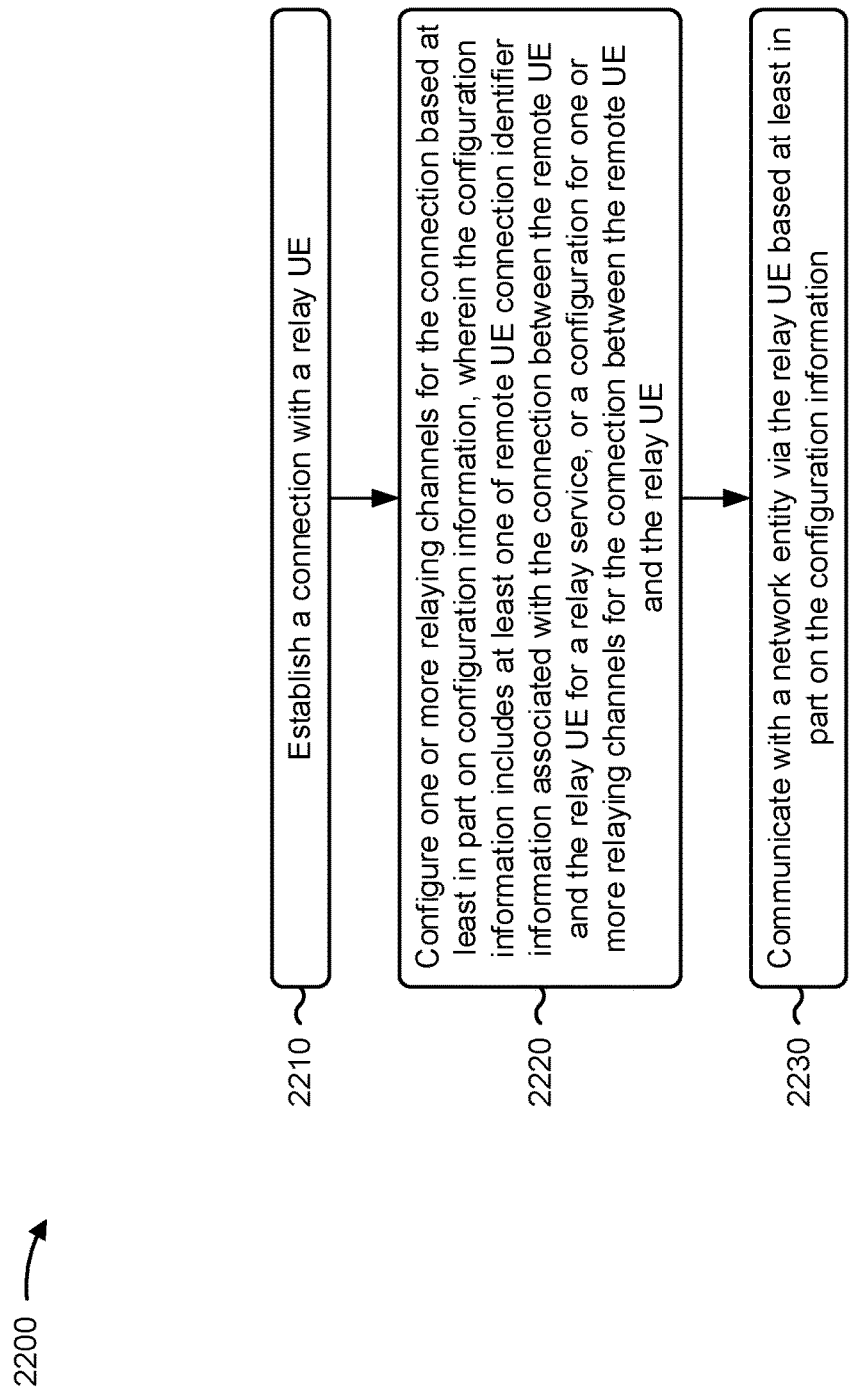
FIG. 22 is a diagram illustrating an example process performed, for example, by a remote user equipment, in accordance with the present disclosure.

FIG. 22 is a diagram illustrating an example process 2200 performed, for example, by a remote UE, in accordance with the present disclosure. Example process 2200 is an example where the remote UE (e.g., UE 120, remote UE 305, remote UE 405,) performs operations associated with relay adaptation protocol layer configuration.

As shown in FIG. 22, in some aspects, process 2200 may include establishing a connection with a relay UE (block 2210). For example, the remote UE (e.g., using controller/processor 280, transmit processor 264, TX MIMO processor 266, MOD 254, antenna 252, and/or the like) may establish a connection with a relay UE, as described above.

As further shown in FIG. 22, in some aspects, process 2200 may include configuring one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE (block 2220). For example, the remote UE (e.g., using antenna 252, DEMOD 254, MIMO detector 256, receive processor 258, controller/processor 280, and/or the like) may configure one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE, as described above.

As further shown in FIG. 22, in some aspects, process 2200 may include communicating with a network entity via the relay UE based at least in part on the configuration information (block 2230). For example, the remote UE (e.g., using controller/processor 280, transmit processor 264, TX MIMO processor 266, MOD 254, antenna 252, and/or the like) may communicate with a network entity via the relay UE based at least in part on the configuration information, as described above.

Process 2200 may include additional aspects, such as any single aspect or any combination of aspects described below and/or in connection with one or more other processes described elsewhere herein.

In a first aspect, the relay service is identified by a relay service code, and wherein establishment of the connection is based at least in part on a security setting corresponding to the relay service code.

In a second aspect, alone or in combination with the first aspect, process 2200 includes receiving, based at least in part on the relay service code, a configuration for a set of one or more remote UE dedicated radio bearers, or one or more remote UE signaling radio bearers for the connection, that use the security setting.

In a third aspect, alone or in combination with one or more of the first and second aspects, a relaying channel, of the one or more relaying channels, is associated with multiple radio access signaling radio bearers, and wherein a relay adaption protocol layer of the remote UE indicates an index of a selected radio access signaling radio bearer for a communication via the relaying channel.

In a fourth aspect, alone or in combination with one or more of the first through third aspects, the remote UE is associated with a radio access inactive state, a radio access idle state, or an out-of-coverage state, and wherein the method further comprises receiving, in connection with configuring a radio access data radio bearer, information indicating a remote UE index of the remote UE, a configuration of the radio access data radio bearer, and a relaying channel configuration including a relaying channel identifier for a relaying channel of the one or more relaying channels of the connection.

In a fifth aspect, alone or in combination with one or more of the first through fourth aspects, process 2200 includes transmitting, to the relay UE, information indicating a connection index for the connection.

In a sixth aspect, alone or in combination with one or more of the first through fifth aspects, process 2200 includes receiving, in connection with a connection identifier update procedure, information indicating an updated remote UE index of the remote UE.

In a seventh aspect, alone or in combination with one or more of the first through sixth aspects, process 2200 includes transmitting, to the relay UE, a link identifier update request based at least in part on a timer, and performing a connection identifier update procedure with the relay UE based at least in part on the link identifier update request.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

The following provides an overview of some Aspects of the present disclosure:

Aspect 1: A method of wireless communication performed by a relay user equipment (UE), comprising: establishing a connection with a remote UE for relaying communication; receiving, from a network entity, configuration information comprising at least one of: remote UE connection identifier information associated with the connection between the remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; configuring the one or more relaying channels of the connection and the one or more relaying channels of the link with the network entity based at least in part on the configuration information; and relaying communications between the remote UE and the network entity based at least in part on the configuration information.

Aspect 2: The method of Aspect 1, wherein the connection is via a sidelink signaling interface.

Aspect 3: The method of Aspect 1, wherein at least part of the configuration information is used by a relay adaptation protocol (RAP) layer of the relay UE to relay the communications.

Aspect 4: The method of Aspect 1, wherein the relaying channel mapping uses one of: a one-to-one basis, or an N-to-one basis, where N is variable.

Aspect 5: The method of Aspect 1, wherein the connection is at least one of: a sidelink unicast link setup using a sidelink signaling interface, a Bluetooth connection, a WiFi connection, or a device to device connection.

Aspect 6: The method of Aspect 1, wherein the remote UE connection identifier information corresponds to a remote UE index, wherein the connection is uniquely associated with an assigned remote UE connection identifier identified by the remote UE connection identifier information.

Aspect 7: The method of Aspect 6, wherein, for a sidelink unicast link, the remote UE connection identifier is based at least in part on a source Layer 2 identifier and a target Layer 2 identifier associated with the sidelink unicast link.

Aspect 8: The method of Aspect 1, further comprising: assigning a unique index associated with the connection, wherein the unique index is an assigned remote UE connection identifier identified by the remote UE connection identifier information; and transmitting information indicating the unique index to the network entity via a radio resource control message.

Aspect 9: The method of Aspect 8, wherein a set of one or more sidelink dedicated radio bearers or signaling radio bearers use a same security setting based at least in part on the connection associated with the relay service.

Aspect 10: The method of Aspect 1, wherein the connection supports one or more of: multiple relaying channels for one or more radio access bearers of the remote UE, multiple radio access protocol data unit sessions on a single link, or multiple relaying channels with a same or different quality of service configuration.

Aspect 11: The method of Aspect 1, wherein the communications are relayed via multiple radio access relaying channels associated with multiple remote UEs.

Aspect 12: The method of Aspect 11, wherein a radio access relaying channel is mapped to multiple relaying channels for the connection.

Aspect 13: The method of Aspect 1, wherein relaying the communications is based at least in part on a relay adaptation protocol (RAP) header, wherein the RAP header indicates one or more of: an identifier of the remote UE based at least in part on a unique identifier of the connection, the one or more relaying channels for the connection associated with a radio access bearer associated with the remote UE, or a path identifier for data routing associated with the relay service.

Aspect 14: The method of Aspect 1, wherein relaying the communications is based at least in part on a radio access data radio bearer of a protocol data unit session configured to satisfy a quality of service associated with the relay service.

Aspect 15: The method of Aspect 1, wherein the one or more relaying channels of the connection correspond to one or more radio access signaling radio bearers or one or more radio access data radio bearers.

Aspect 16: The method of Aspect 1, wherein the configuration information indicates a plurality of radio access signaling radio bearers that are multiplexed onto a single connection relaying channel based at least in part on one or more indexes of the plurality of radio access signaling radio bearers.

Aspect 17: The method of Aspect 1, wherein the configuration information indicates a radio access relaying channel that is configured for multiplexing multiple radio access signaling radio bearers associated with the remote UE.

Aspect 18: The method of Aspect 1, wherein the relaying is performed by a relay adaptation protocol (RAP) layer of the relay UE that is based at least in part on a backhaul adaptation protocol (BAP) associated with an integrated access backhaul technology.

Aspect 19: The method of Aspect 18, further comprising: exchanging, with the remote UE, one or more relaying channel identifiers for the connection while configuring the connection for the relay service.

Aspect 20: The method of Aspect 19, further comprising: maintaining a mapping between the one or more relaying channel identifiers for the connection and one or more logical channel identifiers assigned to one or more logical channels associated with the one or more relaying channels for the connection.

Aspect 21: The method of Aspect 1, wherein the remote UE is in a radio access connected mode, and wherein receiving the configuration information is triggered based at least in part on a handover of the remote UE from a radio access connection to a relaying connection via the relay UE, and wherein the configuration information includes a bearer configuration associated with one or more radio access data radio bearers or signaling radio bearers.

Aspect 22: The method of Aspect 21, further comprising: receiving, from the remote UE, information indicating a remote UE connection identifier; associating the remote UE connection identifier to the connection between the remote UE and the relay UE; and transmitting the remote UE connection identifier to the network entity via a radio resource control message.

Aspect 23: The method of Aspect 1, further comprising: configuring a privacy setting for the relay service; determining to update identifiers of the connection; performing a connection identifier update with the remote UE; updating one or more radio access relaying channel identifiers and an assigned remote UE index based at least in part on a successful result of the connection identifier update; and transmitting a response message to the network entity indicating a successful result of the connection identifier update.

Aspect 24: The method of Aspect 23, wherein determining to update the identifiers for the connection is based at least in part on at least one of: receiving an indication from the network entity to update at least one of: a source Layer 2 identifier corresponding to a sidelink unicast link, a destination Layer 2 identifier corresponding to the sidelink unicast link, one or more radio access relaying channel identifiers, or an assigned remote UE index, a configuration maintained for the connection, or receiving a link identifier update request from the remote UE.

Aspect 25: The method of Aspect 24, further comprising: transmitting a notification to the network entity before initiating the connection identifier update.

Aspect 26: The method of Aspect 1, further comprising: releasing the connection; and transmitting, to the network entity, an indication that the connection has been released.

Aspect 27: A method of wireless communication performed by a network entity, comprising: transmitting, to a relay user equipment (UE), configuration information comprising at least one of: remote UE connection identifier information associated with a connection between a remote UE and the relay UE for a relay service, a configuration including relaying channel identifier information, wherein the configuration is for the connection between the remote UE and the relay UE and for a link with the network entity, wherein the configuration indicates a relaying channel mapping between one or more relaying channels of the connection and one or more relaying channels of the link with the network entity; and communicating with the remote UE via the relay UE based at least in part on the configuration information.

Aspect 28: The method of Aspect 27, wherein the configuration information is for a relay adaptation protocol (RAP) layer of the relay UE.

Aspect 29: The method of Aspect 27, further comprising: configuring a radio access data radio bearer or protocol data unit session to satisfy a quality of service associated with the relay service.

Aspect 30: The method of Aspect 27, wherein the configuration information indicates the one or more relaying channels of the connection correspond to one or more radio access signaling radio bearers or one or more radio access data radio bearers.

Aspect 31: The method of Aspect 27, wherein the remote UE is associated with a radio access inactive state, a radio access idle state, or an out-of-coverage state, and wherein transmitting the configuration information further comprises: transmitting the configuration information based at least in part on receiving an indication by the relay UE regarding setup of the connection with the remote UE for relaying, wherein the configuration information configures the one or more relaying channels of the connection in association with one or more remote UE signaling radio bearers.

Aspect 32: The method of Aspect 31, wherein the method further comprises: transmitting, to the remote UE via the relay UE, information indicating a relaying channel identifier, for the one or more relaying channels of the connection, for the remote UE.

Aspect 33: The method of Aspect 27, wherein the remote UE is associated with a radio access inactive state, a radio access idle state, or an out-of-coverage state, and wherein transmitting the configuration information further comprises: transmitting the configuration information based at least in part on successful configuration of the connection with the remote UE, wherein the configuration information configures the one or more relaying channels of the connection in association with one or more remote UE data radio bearers.

Aspect 34: The method of Aspect 33, further comprising: transmitting, to the remote UE, information indicating a remote UE index, the one or more remote UE data radio bearers, and one or more relaying channel identifiers associated with the one or more relaying channels of the connection.

Aspect 35: The method of Aspect 33, further comprising: receiving information indicating one or more relaying channel identifiers associated with configuring the connection.

Aspect 36: The method of Aspect 27, wherein the remote UE is in a radio access connected mode, and wherein transmitting the configuration information further comprises: transmitting the configuration information based at least in part on a handover of the remote UE from a radio access connection to a relaying connection via the connection, wherein the configuration information includes a bearer configuration associated with one or more remote UE data radio bearers or signaling radio bearers.

Aspect 37: The method of Aspect 36, further comprising: transmitting, to the remote UE in a handover command, information indicating a remote UE index associated with the remote UE.

Aspect 38: The method of Aspect 36, further comprising: receiving, from the relay UE, a connection index determined by the relay UE via a radio resource control message.

Aspect 39: The method of Aspect 27, further comprising: determining to update at least one of a source Layer 2 (L2) identifier or a destination L2 identifier of the connection, wherein the connection is a sidelink unicast link; triggering a connection identifier update of the relay UE and the remote UE based at least in part on determining to update at least one of the source L2 identifier or the destination L2 identifier; and receiving a response message from the relay UE indicating a successful result of the connection identifier update.

Aspect 40: The method of Aspect 39, wherein triggering the connection identifier update is based at least in part on an indication to update at least one of: the source L2 identifier, the destination L2 identifier, one or more radio access relaying channel identifiers, or an assigned remote UE index.

Aspect 41: The method of Aspect 40, wherein triggering the connection identifier update is based at least in part on a timer associated with the connection identifier.

Aspect 42: The method of Aspect 40, further comprising: transmitting, to the remote UE, information indicating an assigned remote UE index.

Aspect 43: The method of Aspect 27, further comprising: receiving a notification from the relay UE indicating that a connection identifier update procedure is to be performed to update at least one of a source Layer 2 (L2) identifier or a destination L2 identifier of the connection, wherein the updating of the source L2 identifier or the destination L2 identifier of the connection is triggered by the relay UE based at least in part on a timer.

Aspect 44: The method of Aspect 43, further comprising: transmitting, to the relay UE, information indicating at least one of an updated radio access relaying channel identifier or an assigned remote UE index associated with the connection.

Aspect 45: The method of Aspect 27, further comprising: transmitting a release indication that indicates to release the connection, wherein the release indication is based at least in part on at least one of: a handover of the remote UE to a radio access connection, a load associated with the relay UE, or a quality of service requirement.

Aspect 46: The method of Aspect 27, further comprising: receiving a relay adaptation protocol (RAP) protocol data unit (PDU); determining a signaling radio bearer or data radio bearer associated with the remote UE based at least in part on a RAP header of the received RAP PDU; removing the RAP header; and transferring a New Radio packet data convergence protocol (PDCP) PDU of the RAP PDU to an upper layer.

Aspect 47: The method of Aspect 27, further comprising: determining a remote UE index associated with the connection for the remote UE; determining a relaying channel for the connection of the remote UE corresponding to a radio access bearer of the remote UE, determining a radio access relaying channel corresponding to the relaying channel for the connection of the remote UE; generating a relay adaptation protocol (RAP) header including at least one of the remote UE Index, a relaying channel identifier of the relaying channel for the connection of the remote UE, or a path identifier; and transmitting a RAP layer protocol data unit (PDU) with the RAP header on the radio access relaying channel.

Aspect 48: A method of wireless communication performed by a remote user equipment (UE), comprising: establishing a connection with a relay UE; configuring one or more relaying channels for the connection based at least in part on configuration information, wherein the configuration information includes at least one of: remote UE connection identifier information associated with the connection between the remote UE and the relay UE for a relay service, or a configuration for one or more relaying channels for the connection between the remote UE and the relay UE; and communicating with a network entity via the relay UE based at least in part on the configuration information.

Aspect 49: The method of Aspect 48, wherein the relay service is identified by a relay service code, and wherein establishment of the connection is based at least in part on a security setting corresponding to the relay service code.

Aspect 50: The method of Aspect 49, further comprising: receiving, based at least in part on the relay service code, a configuration for a set of one or more remote UE dedicated radio bearers, or one or more remote UE signaling radio bearers for the connection, that use the security setting.

Aspect 51: The method of Aspect 48, wherein a relaying channel, of the one or more relaying channels, is associated with multiple radio access signaling radio bearers, and wherein a relay adaption protocol layer of the remote UE indicates an index of a selected radio access signaling radio bearer for a communication via the relaying channel.

Aspect 52: The method of Aspect 48, wherein the remote UE is associated with a radio access inactive state, a radio access idle state, or an out-of-coverage state, and wherein the method further comprises: receiving, in connection with configuring a radio access data radio bearer, information indicating a remote UE index of the remote UE, a configuration of the radio access data radio bearer, and a relaying channel configuration including a relaying channel identifier for a relaying channel of the one or more relaying channels of the connection.

Aspect 53: The method of Aspect 52, further comprising: transmitting, to the relay UE, information indicating a connection index for the connection.

Aspect 54: The method of Aspect 48, further comprising: receiving, in connection with a connection identifier update procedure, information indicating an updated remote UE index of the remote UE.

Aspect 55: The method of Aspect 48, further comprising: transmitting, to the relay UE, a link identifier update request based at least in part on a timer; and performing a connection identifier update procedure with the relay UE based at least in part on the link identifier update request.

Aspect 56: An apparatus for wireless communication at a device, comprising a processor; memory coupled with the processor; and instructions stored in the memory and executable by the processor to cause the apparatus to perform the method of one or more of Aspects 1-55.

Aspect 57: A device for wireless communication, comprising a memory and one or more processors coupled to the memory, the one or more processors configured to perform the method of one or more of Aspects 1-55.

Aspect 58: An apparatus for wireless communication, comprising at least one means for performing the method of one or more of Aspects 1-55.

Aspect 59: A non-transitory computer-readable medium storing code for wireless communication, the code comprising instructions executable by a processor to perform the method of one or more of Aspects 1-55.

Aspect 60: A non-transitory computer-readable medium storing a set of instructions for wireless communication, the set of instructions comprising one or more instructions that, when executed by one or more processors of a device, cause the device to perform the method of one or more of Aspects 1-55.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a relay user equipment (UE), comprising:
    a memory; and
    one or more processors, coupled to the memory, configured to:
        establish a connection with a remote UE for relaying communication;
        receive, from a network entity, configuration information comprising:
            remote UE connection identifier information associated with the connection between the remote UE and the relay UE for a relay service, and
            a configuration including relaying channel identifier information, wherein the configuration is for the connection between the remote UE and the relay UE and for a link with the network entity, wherein the configuration indicates a relaying channel mapping, wherein the relaying channel mapping is between one or more relaying channels of the connection to one or more relaying channels of the link with the network entity, wherein the configuration is based at least in part on a relay adaptation protocol (RAP) layer supporting a radio bearer mapping between one or more radio bearers associated with the remote UE and the one or more relaying channels;
        configure the one or more relaying channels of the connection and the one or more relaying channels of the link with the network entity based at least in part on the configuration information; and
        relay communications between the remote UE and the network entity based at least in part on the configuration information.

2. The apparatus of claim 1, wherein at least part of the configuration information is used by the RAP layer to relay the communications.

3. The apparatus of claim 1, wherein the relaying channel mapping uses one of:
    a one-to-one basis, or
    an N-to-one basis, where N is variable.

4. The apparatus of claim 1, wherein the connection is at least one of:
    a sidelink unicast link setup using a sidelink signaling interface,
    a Bluetooth connection,
    a WiFi connection, or
    a device to device connection.

5. The apparatus of claim 1, wherein the remote UE connection identifier information corresponds to a remote UE index, wherein the connection is uniquely associated with an assigned remote UE connection identifier identified by the remote UE connection identifier information.

6. The apparatus of claim 1, wherein the one or more processors are further configured to:
    assign a unique index associated with the connection, wherein the unique index is an assigned remote UE connection identifier identified by the remote UE connection identifier information; and
    transmit information indicating the unique index to the network entity via a radio resource control message.

7. The apparatus of claim 6, wherein the one or more radio bearers comprise a set of one or more sidelink dedicated radio bearers or signaling radio bearers, wherein the set of one or more sidelink dedicated radio bearers or signaling radio bearers use a same security setting based at least in part on the connection associated with the relay service.

8. The apparatus of claim 1, wherein the communications are relayed via multiple radio access relaying channels mapped to multiple relaying channels associated with multiple remote UEs.

9. The apparatus of claim 1, wherein relaying the communications is based at least in part on a RAP header, wherein the RAP header indicates one or more of:
    an identifier of the remote UE based at least in part on a unique identifier of the connection,
    the one or more relaying channels of the connection associated with the one or more radio bearers associated with the remote UE, or
    a path identifier for data routing associated with the relay service.

10. The apparatus of claim 1, wherein the one or more radio bearers comprise a radio access data radio bearer of the remote UE, wherein relaying the communications is based at least in part on the radio access data radio bearer of a remote UE protocol data unit session configured to satisfy a quality of service associated with the relay service.

11. The apparatus of claim 1, wherein the one or more radio bearers comprise one or more radio access signaling radio bearers or one or more radio access data radio bearers of the remote UE, wherein the one or more relaying channels of the connection correspond to the one or more radio access signaling radio bearers or one or more radio access data radio bearers of the remote UE.

12. The apparatus of claim 1, wherein the one or more radio bearers comprise a plurality of remote UE radio access signaling radio bearers, wherein the configuration information indicates the plurality of remote UE radio access signaling radio bearers that are multiplexed onto a single relaying channel for the connection based at least in part on one or more indexes of the plurality of remote UE radio access signaling radio bearers.

13. The apparatus of claim 1, wherein the one or more radio bearers comprise multiple radio access signaling radio bearers associated with the remote UE, wherein the configuration information indicates a radio access relaying channel that is configured for multiplexing the multiple radio access signaling radio bearers associated with the remote UE.

14. The apparatus of claim 1, wherein the relaying is performed by the RAP layer based at least in part on a backhaul adaptation protocol (BAP) associated with an integrated access backhaul technology.

15. The apparatus of claim 14, wherein the one or more processors are further configured to:
    exchange, with the remote UE, one or more relaying channel identifiers for the connection while configuring the connection for the relay service.

16. The apparatus of claim 15, wherein the one or more processors are further configured to:
    receive, from the remote UE, information indicating a remote UE connection identifier;

associate the remote UE connection identifier to the connection between the remote UE and the relay UE; and transmit the remote UE connection identifier to the network entity via a radio resource control message.

17. The apparatus of claim 1, wherein the one or more processors are further configured to:

configure a privacy setting for the relay service;

determine to update identifiers of the connection;

perform a connection identifier update with the remote UE;

update one or more radio access relaying channel identifiers and an assigned remote UE index based at least in part on a successful result of the connection identifier update; and transmit a message to the network entity indicating a successful result of the connection identifier update, wherein the connection identifier update indication includes an updated remote UE index assigned for the connection based at least in part on the connection identifier update.

18. The apparatus of claim 1, wherein the one or more processors are further configured to:

release the connection; and transmit, to the network entity, an indication that the connection has been released.

19. An apparatus for wireless communication at a network entity, comprising:

a memory; and one or more processors, coupled to the memory, configured to:

transmit, to a relay user equipment (UE), configuration information comprising:

remote UE connection identifier information associated with a connection between a remote UE and the relay UE for a relay service, and a configuration including relaying channel identifier information, wherein the configuration is for the connection between the remote UE and the relay UE and for a link with the network entity, wherein the configuration indicates a relaying channel mapping, wherein the relaying channel mapping is between one or more relaying channels of the connection to one or more relaying channels of the link with the network entity, wherein the configuration is based at least in part on a relay adaptation protocol (RAP) layer supporting a radio bearer mapping between a radio bearer associated with the remote UE and the one or more relaying channels; and communicate with the remote UE via the relay UE based at least in part on the configuration information.

20. The apparatus of claim 19, wherein the one or more radio bearers comprise one or more radio access signaling radio bearers or one or more radio access data radio bearers of the remote UE, and wherein the configuration information indicates the one or more relaying channels of the connection correspond to the one or more radio access signaling radio bearers or the one or more radio access data radio bearers of the remote UE.

21. The apparatus of claim 19, wherein the remote UE is associated with a radio access inactive state, a radio access idle state, or an out-of-coverage state, wherein the one or more radio bearers comprise one or more remote UE signaling or data radio bearers, and wherein the one or more processors, to transmit the configuration information, are configured to:

transmit the configuration information based at least in part on receiving an indication by the relay UE regarding setup of the connection with the remote UE for relaying; or transmit the configuration information based at least in part on successful configuration of the connection with the remote UE, and wherein the one or more processors are further configured to:

transmit, to the remote UE, information indicating a remote UE index, the one or more remote UE signaling or data radio bearers, and one or more relaying channel identifiers associated with the one or more relaying channels of the connection.

22. The apparatus of claim 19, wherein the one or more radio bearers comprise one or more remote UE data radio bearers or signaling radio bearers, wherein the remote UE is in a radio access connected mode, and wherein the one or more processors, to transmit the configuration information, are further configured to:

transmit the configuration information based at least in part on a handover of the remote UE from a radio access connection to a relaying connection via the connection, wherein the configuration information includes a bearer configuration associated with the one or more remote UE data radio bearers or signaling radio bearers.

23. The apparatus of claim 22, wherein the one or more processors are further configured to:

transmit, to the remote UE in a handover command, information indicating a remote UE index associated with the remote UE.

24. The apparatus of claim 22, wherein the one or more processors are further configured to:

receive, from the relay UE, a connection index determined by the relay UE via a radio resource control message.

25. The apparatus of claim 19, wherein the one or more processors are further configured to:

receive a notification from the relay UE indicating that a connection identifier update procedure is successful, wherein the notification includes a new remote UE index assigned for the connection.

26. The apparatus of claim 19, wherein the one or more processors are further configured to:

transmit a release indication that indicates to release the connection, wherein the release indication is based at least in part on at least one of:

a handover of the remote UE to a radio access connection, a load associated with the relay UE, or a quality of service requirement.

27. The apparatus of claim 19, wherein the one or more processors are further configured to:

receive a RAP protocol data unit (PDU);

determine a signaling radio bearer or data radio bearer of the one or more radio bearers associated with the remote UE based at least in part on a RAP header of the received RAP PDU;

remove the RAP header; and transfer a New Radio packet data convergence protocol (PDCP) PDU of the RAP PDU to an upper layer.

28. The apparatus of claim 19, wherein the one or more processors are further configured to:

determine a remote UE index associated with the connection of the remote UE;

determine a relaying channel for the connection of the remote UE corresponding to a radio access bearer of the remote UE, determine a radio access relaying channel corresponding to the relaying channel for the connection of the remote UE;

generate a RAP header including at least one of the remote UE Index, a relaying channel identifier of the relaying channel for the connection of the remote UE, or a path identifier; and transmit a RAP layer protocol data unit (PDU) with the RAP header on the radio access relaying channel.

29. An apparatus for wireless communication at a remote user equipment (UE), comprising:

a memory; and one or more processors, coupled to the memory, configured to:

establish a connection with a relay UE;

configure one or more relaying channels for the connection based at least in part on configuration information, wherein the configuration information comprises:

remote UE connection identifier information associated with the connection between the remote UE and the relay UE for a relay service, and a configuration for one or more relaying channels for the connection between the remote UE and the relay UE, wherein the configuration indicates a relaying channel mapping, wherein the relaying channel mapping is between one or more relaying channels of the connection to one or more relaying channels of a link between the relay UE and a network entity, wherein the configuration is based at least in part on a relay adaptation protocol (RAP) layer supporting a radio bearer mapping between one or more radio bearers associated with the remote UE and the one or more relaying channels; and communicate with the network entity via the relay UE based at least in part on the configuration information.

30. The apparatus of claim 29, wherein the relay service is identified by a relay service code, and wherein establishment of the connection is based at least in part on a security setting corresponding to the relay service code.

31. The apparatus of claim 29, wherein the one or more radio bearers comprise multiple radio access signaling radio bearers, wherein a relaying channel, of the one or more relaying channels, is associated with the multiple radio access signaling radio bearers, and wherein a relay adaption protocol layer of the remote UE indicates an index of a selected radio access signaling radio bearer of the multiple radio access signaling radio bearers for a communication via the relaying channel.

32. The apparatus of claim 29, wherein the one or more radio bearers comprise a radio access signaling or data radio bearer, wherein the remote UE is associated with a radio access inactive state, a radio access idle state, or an out-of-coverage state, and wherein the one or more processors are further configured to:

receive, in connection with configuring the radio access signaling or data radio bearer, information indicating a remote UE index of the remote UE, a configuration of the radio access signaling or data radio bearer, and a relaying channel configuration including a relaying channel identifier for a relaying channel of the one or more relaying channels of the connection.

33. The apparatus of claim 32, wherein the one or more processors are further configured to:

transmit, to the relay UE, information indicating a connection index for the connection.

34. The apparatus of claim 29, wherein the one or more processors are further configured to:

receive, in connection with a connection identifier update procedure, information indicating an updated remote UE index of the remote UE.

35. The apparatus of claim 29, wherein the one or more processors are further configured to:

transmit, to the relay UE, a link identifier update request based at least in part on a timer; and perform a connection identifier update procedure with the relay UE based at least in part on the link identifier update request.

* * * * *